US010769622B2

(12) United States Patent
Daniel et al.

(10) Patent No.: US 10,769,622 B2
(45) Date of Patent: Sep. 8, 2020

(54) USER COMMUNICATIONS WITH A MERCHANT THROUGH A SOCIAL NETWORKING SYSTEM

(71) Applicant: Facebook, Inc., Menlo Park, CA (US)

(72) Inventors: Robert Franklin Daniel, Redwood City, CA (US); Akash Gaurav Gupta, San Francisco, CA (US); Garima Sinha, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 625 days.

(21) Appl. No.: 14/938,472

(22) Filed: Nov. 11, 2015

(65) Prior Publication Data

US 2016/0283936 A1    Sep. 29, 2016

Related U.S. Application Data

(60) Provisional application No. 62/138,382, filed on Mar. 25, 2015.

(51) Int. Cl.
*G06Q 20/38* (2012.01)
*G06Q 20/36* (2012.01)
*G06Q 30/06* (2012.01)
*G06Q 50/00* (2012.01)
*G06Q 20/12* (2012.01)

(52) U.S. Cl.
CPC ......... *G06Q 20/3672* (2013.01); *G06Q 20/12* (2013.01); *G06Q 20/382* (2013.01); *G06Q 20/3827* (2013.01); *G06Q 30/0619* (2013.01); *G06Q 50/01* (2013.01); *G06Q 2220/00* (2013.01)

(58) Field of Classification Search
CPC .................................................. G06Q 20/3274
USPC ...................................................... 705/35, 75
See application file for complete search history.

(56) References Cited

U.S. PATENT DOCUMENTS

| 6,463,533 | B1 | 10/2002 | Calamera et al. |
| 2010/0063895 | A1 | 3/2010 | Dominguez et al. |
| 2011/0131504 | A1 | 6/2011 | Shustef |
| 2013/0054459 | A1* | 2/2013 | Granbery ............. G06Q 20/382 705/44 |
| 2013/0190039 | A1* | 7/2013 | Lee ........................ G06Q 50/12 455/552.1 |
| 2014/0101736 | A1* | 4/2014 | Mays ............... H04N 21/44222 726/6 |

(Continued)

FOREIGN PATENT DOCUMENTS

| EP | 1357456 | 10/2003 |
| EP | 2020797 | 2/2009 |

(Continued)

OTHER PUBLICATIONS

Office Action as received in Japanese Application 2017-540596 dated Apr. 9, 2019.

(Continued)

*Primary Examiner* — Chinedu C Agwumezie
(74) *Attorney, Agent, or Firm* — Keller Jolley Preece

(57) ABSTRACT

The present disclosure is directed toward systems and methods for facilitating anonymous communications between a user and a merchant via a social networking system, wherein the user's identifying information is obfuscated from the merchant.

20 Claims, 11 Drawing Sheets

(56) References Cited

U.S. PATENT DOCUMENTS

| | | | |
|---|---|---|---|
| 2014/0126708 A1 | 5/2014 | Sayko | |
| 2014/0172531 A1* | 6/2014 | Liberty | G06Q 20/3276 |
| | | | 705/14.23 |
| 2014/0283122 A1 | 9/2014 | Brunn et al. | |
| 2015/0025986 A1 | 1/2015 | Patel et al. | |
| 2015/0254659 A1* | 9/2015 | Kulkarni | A61L 31/145 |
| | | | 705/71 |
| 2016/0150078 A1* | 5/2016 | Joshi | G06Q 20/3276 |
| | | | 705/14.23 |
| 2017/0132594 A1* | 5/2017 | Morgan | G06Q 20/4014 |
| 2018/0041602 A1* | 2/2018 | Gorti | G06Q 30/02 |

FOREIGN PATENT DOCUMENTS

| | | |
|---|---|---|
| EP | 3073430 | 9/2016 |
| JP | 2004-514200 A | 5/2004 |
| JP | 2005-072707 A | 3/2005 |
| JP | 2006-244420 A | 9/2006 |
| JP | 2013-541298 A | 11/2013 |
| KR | 10-2014-0091984 | 7/2014 |
| WO | WO 2016-153568 | 9/2016 |

OTHER PUBLICATIONS

Extended European Search Report as received in EP 15202940.1 dated Feb. 4, 2016.
European Office Action as received in EP 15202940.1 dated Nov. 16, 2018.
International Search Report & Written Opinion as received in PCT/US2015/065097 dated Mar. 31, 2016.

* cited by examiner

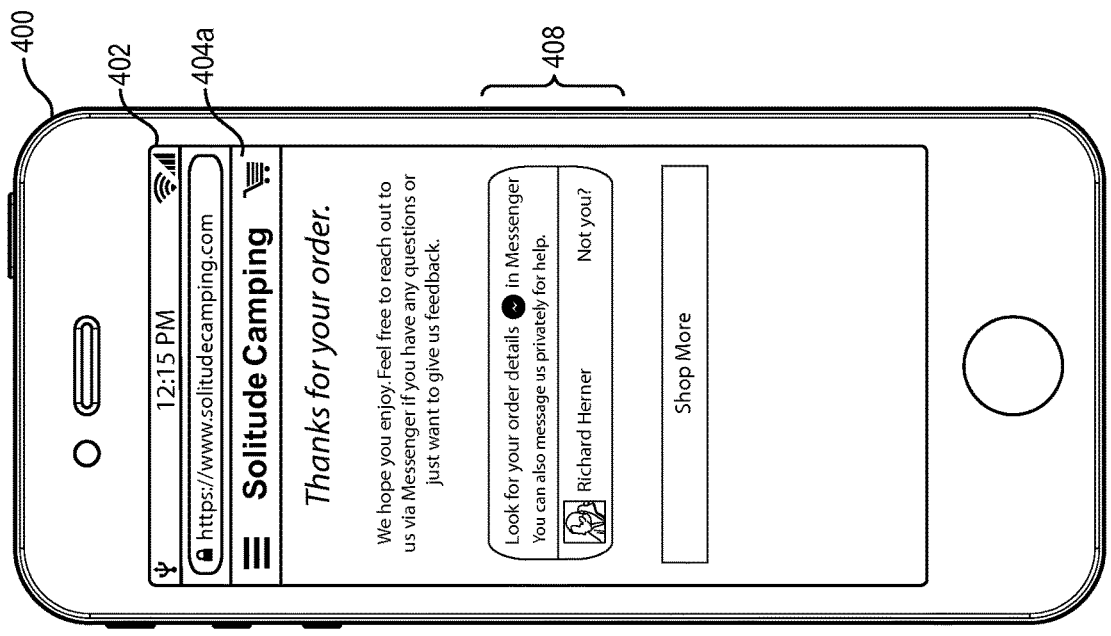
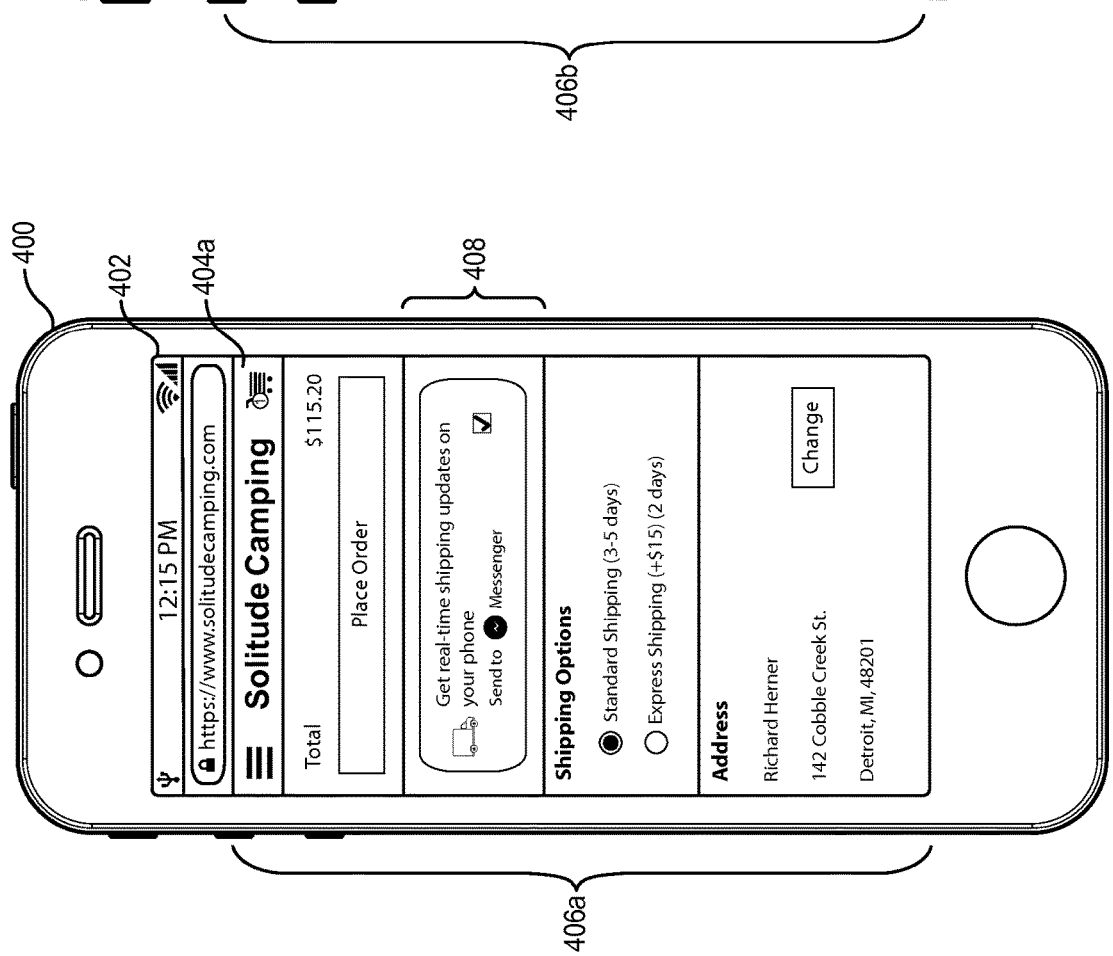
Fig. 4B
Fig. 4A

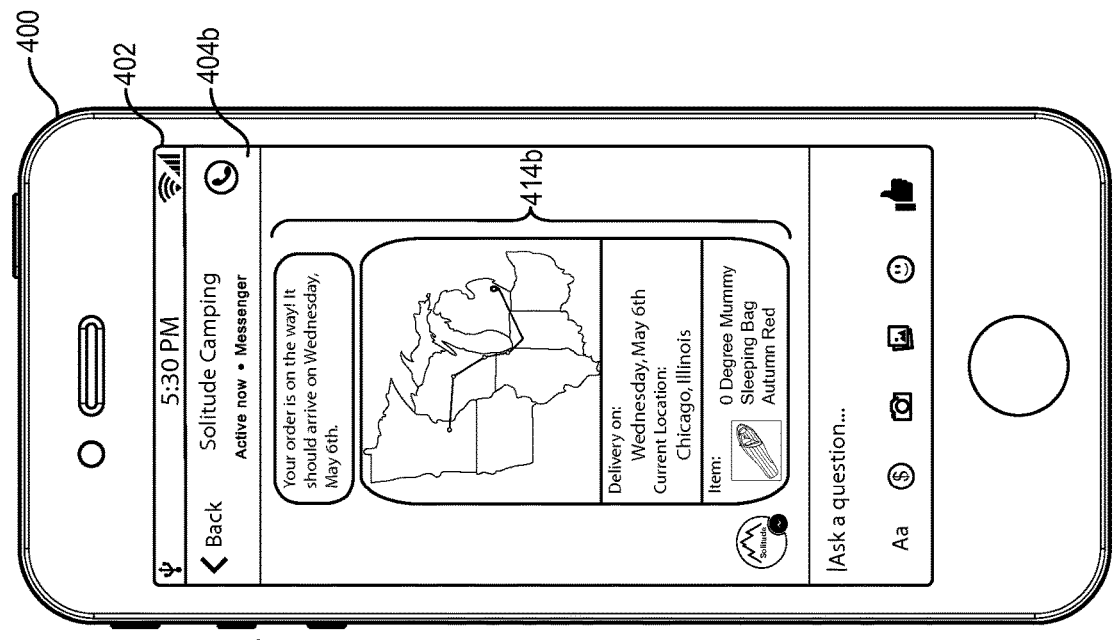
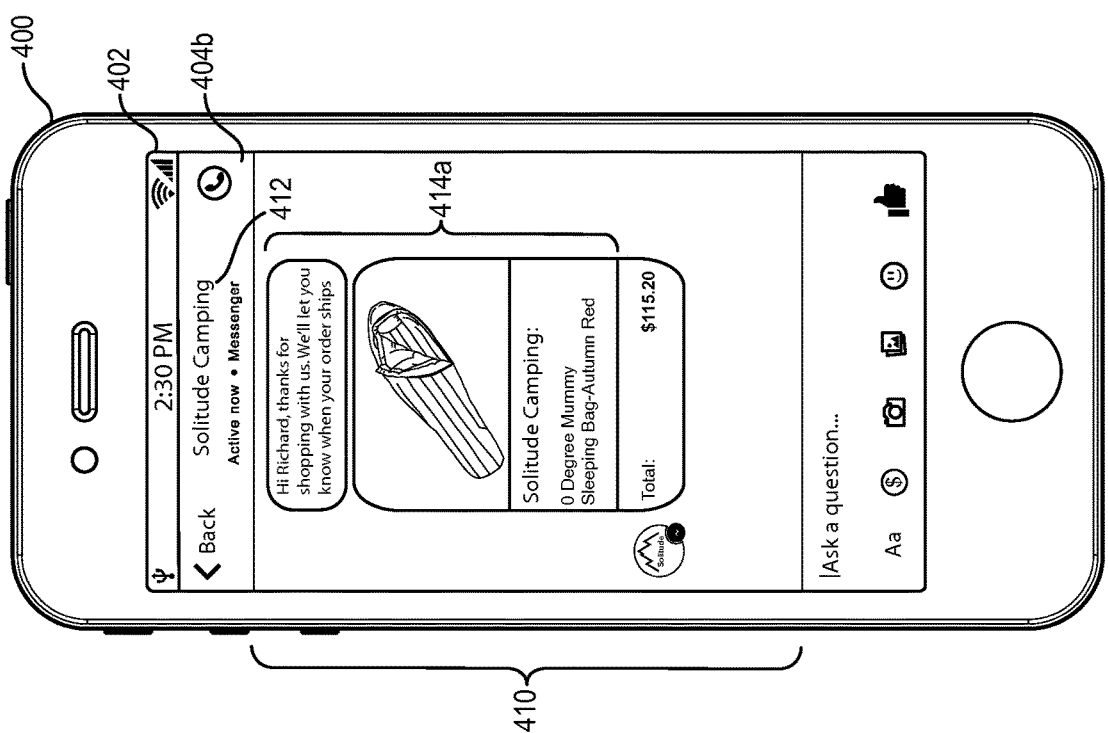
Fig. 4C
Fig. 4D

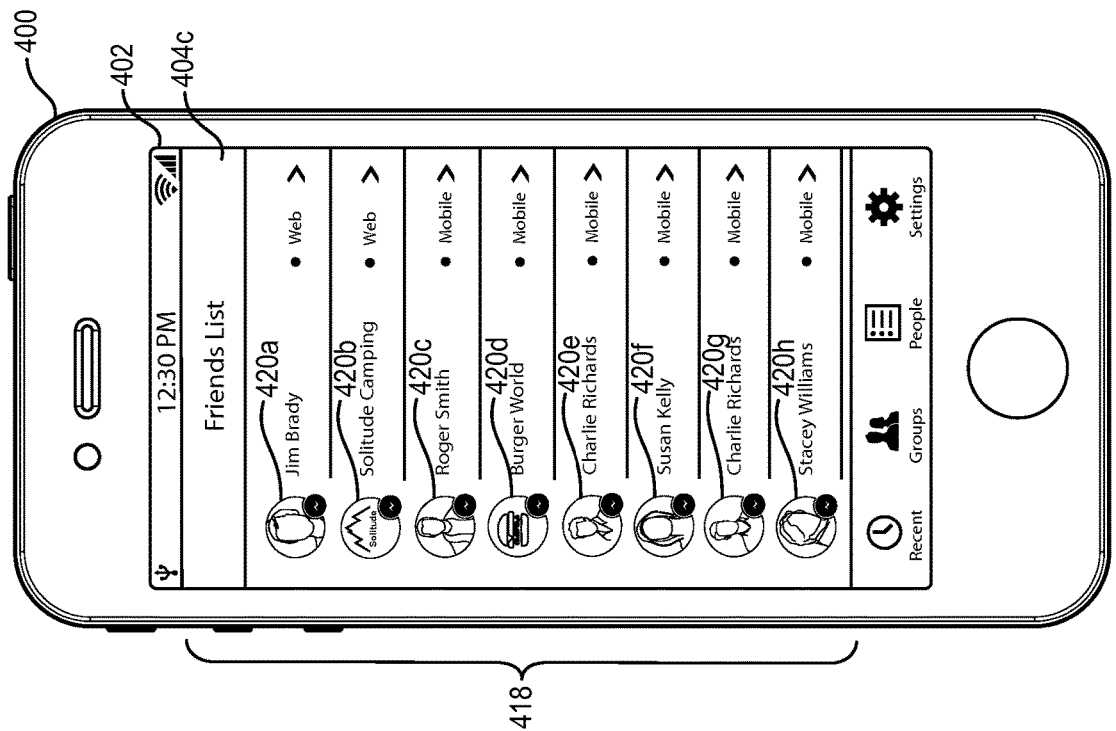
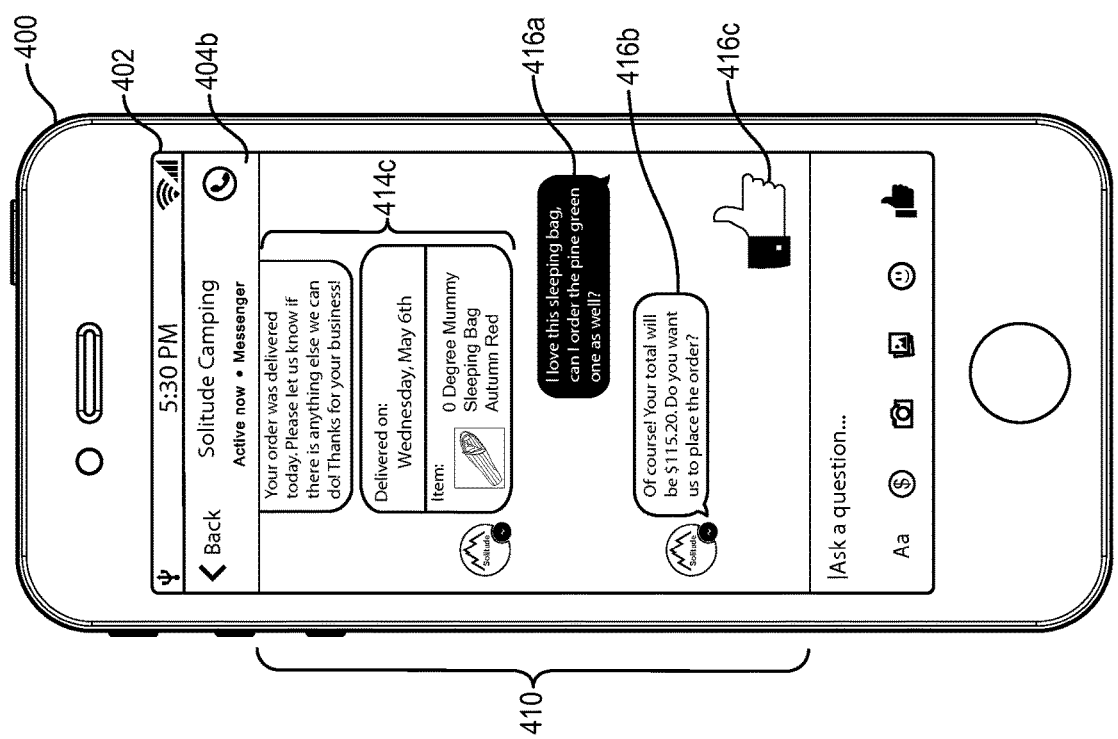
Fig. 4E
Fig. 4F

USER COMMUNICATIONS WITH A MERCHANT THROUGH A SOCIAL NETWORKING SYSTEM

CROSS REFERENCE TO RELATED APPLICATIONS

This application claims priority to U.S. Provisional Application No. 62/138,382, filed Mar. 25, 2015, the benefit of which is hereby claimed. This application is also related to U.S. Pat. No. 8,601,363 filed Jul. 20, 2009 entitled, "Communicating Information About A Local Machine To A Browser Application," and to U.S. Pat. No. 8,250,145 filed Apr. 21, 2010 entitled, "Personalizing A Web Page Outside Of A Social Networking System With Content From The Social Networking System." The entireties of each of the foregoing are incorporated herein by reference.

BACKGROUND

1. Technical Field

One or more embodiments of the present invention relate generally to a social networking system. More specifically, one or more embodiments of the present invention relate to facilitating communications between a social networking system user and a third-party service provider or merchant via the social networking system.

2. Background and Relevant Art

While shopping in physical "brick-and-mortar" stores is common, purchasing goods from online merchants continues to increase in popularity. Online shoppers generally find it very convenient to browse an online merchant's catalog from the ease and comfort of their own homes. Furthermore, online shoppers typically need only wait a day or two to receive the goods they purchased online. Online shoppers generally view this short wait time as minimally inconvenient in comparison with the convenience of not having to leave their homes in order to buy the things they want.

Some aspects of online shopping, however, can become a larger inconvenience to the average online shopper. For example, sometimes an online shopper may have a question for an online merchant regarding a particular product or company policy. In order to ask a question, the online shopper is typically limited to options including calling the online merchant's helpline. This option is often an undesirable one for online shoppers who do not have the time to wait while their call is placed on-hold, or who simply do not like talking on the phone. In some cases, an online merchant may provide an option for an online shopper to send an email to the online merchant. This option is also often undesirable as the online shopper's email generally includes identifying information that the online shopper wishes to keep private (e.g., the online shopper's name and/or email address). Furthermore, email response times are inconsistent, often delayed, and provide no real-time feedback.

Additionally, following the finalization of a purchase transaction between an online shopper and an online merchant, the online shopper typically spends the next several hours or even days with little information regarding how the transaction is being processed by the online merchant. In some cases, the online shopper may receive boilerplate emails from the online merchant informing the online shopper that the order is "being processed," or "has shipped." These emails are often ignored because they are not personalized to the user and they provide little information from the online merchant. Furthermore, the online shopper may not wish to allow the online merchant to keep records of the online shopper's email address.

Thus, there are several disadvantages to current methods for managing communications between online shoppers and online merchants.

SUMMARY

One or more embodiments described herein provide benefits and/or solve one or more of the foregoing or other problems in the art with systems and methods for providing anonymous communications between users and merchants via a social networking system. One or more embodiments described herein include systems and methods for allowing a user and a merchant to communicate in real-time via a social networking system such that the identity of the user obfuscated from the merchant, thereby protecting the user's identity. At least one embodiment allows for anonymous communications between a user and a merchant by generating and exchanging a token, or key.

Furthermore, one or more embodiments described herein include systems and methods for allowing the merchant to send transaction updates and other communications to the user via the social networking system. For example, systems and methods allow the merchant to send updates to the user via the social networking system by utilizing a token including an identifier that is not directly associated with the user. Thus, systems and methods assure that the user's anonymity with the merchant is maintained. Additionally, systems and methods organize the merchant's updates in a single communication thread for the user, such that the user need not receive multiple emails related to the same transaction.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which:

FIGS. 4A-4F illustrate user interfaces including features of the communication system in accordance with one or more embodiments;

DETAILED DESCRIPTION

Figure 1:
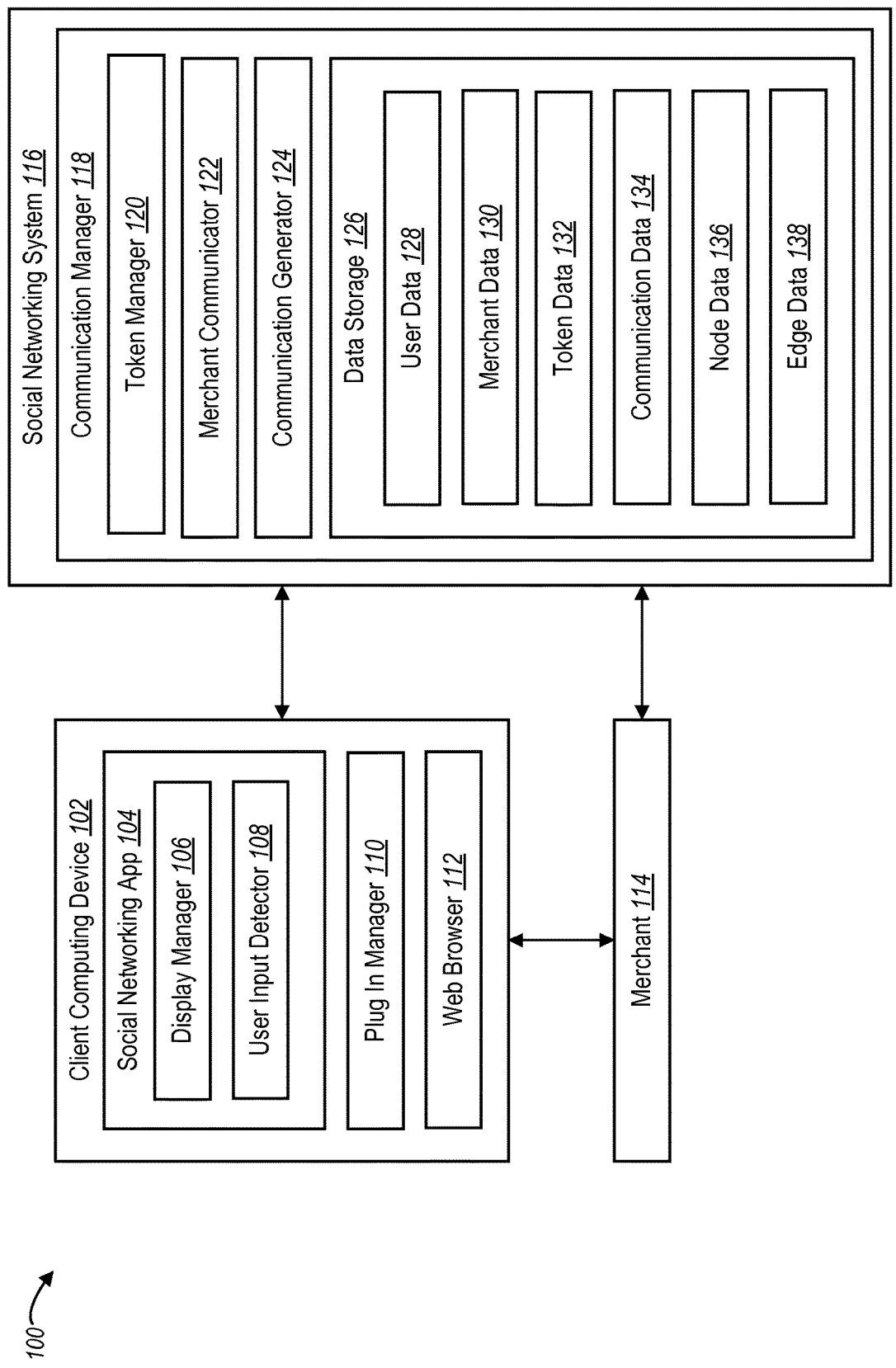
FIG. 1 illustrates a detailed schematic diagram of a communication system in accordance with one or more embodiments.

One or more embodiments described herein provide benefits and/or solve one or more of the foregoing or other problems in the art with systems and methods for facilitating anonymous communications between a merchant and a user. For example, a communication system can generate an opaque token associated with a social networking system user and a particular online merchant. In one or more embodiments, the social networking system can provide the opaque token to the merchant, such that any further communications from the merchant (i.e., for real-time chat, transaction updates, etc.) are based on the opaque token. The social networking system can receive communications from the merchant including the opaque token and provide the communications to the social networking system user associated with the opaque token. Similarly, the social networking system can receive communications from the social networking system user for the merchant, and provide the communications to the merchant based on the opaque token. Thus, the user's anonymity with the merchant is maintained.

By way of illustration, in one embodiment, a user indicates a preference to receive transaction updates and other communications from a merchant by interacting with a plugin presented as part of a merchant's website. The merchant's website presents the plugin to the user as part of the check-out process during which the user purchases a product from the merchant. In response to the detected interaction with the plugin, the social networking system generates an opaque token associated with the user and the merchant, and sends the opaque token to the merchant. From that point forward, the merchant utilizes the opaque token to communicate with the user through the social networking system. Because the opaque token does not identify the user directly, the merchant receives little indication of the user's identity from the social networking system.

As used herein, the term "social networking system" refers to a system that supports and enables on-line communication, input, interaction, content-sharing, and collaboration between users. A user of the social networking system can have one or more "friends" via the social networking system. As used herein, the term "friend" refers to a co-user associated with a user via the social networking system (i.e., a contact or connection).

Also as used herein, a "plugin" is an add-in module that can be pre-installed as part of a standard web browser. Alternately, a user can install a plugin as part of a standard web browser. In one or more embodiments, the plugin includes program code that enhances the capabilities of the web browser. The web browser can interact with the plugin in order to utilize added functionality provided by the plugin. In one or more embodiments, a plugin can include back-end functionality associated with a social networking system. The operation of a plugin is described further below with regard to FIGS. 3A-3B.

Furthermore, as used herein, a "pixel" refers to a code snippet included in a merchant's web page that automatically tracks certain information and provides the user with one or more options via the merchant's web page. For example, in response to the merchant indicating a desire to include a social networking system pixel in one or more of the merchant's web pages, the social networking system provides the merchant with pixel code and social networking system pixel ID that is specific to the merchant. The merchant then includes the pixel code and the merchant's social networking system pixel ID in the code or script for the one or more web pages. As soon as a user loads the merchant's web page including the pixel code, the pixel automatically collects and sends information to the social networking system. In some embodiments, the pixel only automatically collects and sends information to the social networking system if the user has previously opted in (e.g., as part of an account setting) to receive communications from the merchant via the social networking system. Additionally, in some embodiments, the pixel also presents certain information to the user.

A "merchant," as used herein, is a merchant or other service provider who provides goods and/or services to customers. In one or more embodiments, the merchant can provide goods or services for purchase over the Internet via one or more websites. In some embodiments, a merchant may have physical retail locations in addition to one or more websites.

FIG. 1 illustrates a schematic diagram illustrating an example embodiment of a communication system 100 (or simply "system 100"). As shown in FIG. 1, the system 100 may include various components for performing the processes and features described herein. For example, as shown in FIG. 1, the system 100 includes but is not limited to, a social networking system 116, a communication manager 118, and one or more client computing device(s) 102. The communication manager 118 includes, but is not limited to, a token manager 120, a merchant communicator 122, a communication generator 124, and data storage 126, which includes user data 128, merchant data 130, token data 132, communication data 134, node data 136, and edge data 138. The client computing device 102 includes a social networking application 104, which includes a display manager 106 and an input detector 108, as well as a plugin manager 110, and a web browser 112. In one or more embodiments, the system 100 may also include a merchant 114 (e.g., a merchant server accessed by the web browser 112, and communicatively linked to the social networking system 116).

The social networking system 116, each of the components 120-138 of the communication manager 118, each of the components 104-112 of the client computing device 102, and the merchant 114 can be implemented using a computing device including at least one processor executing instructions that cause the system 100 to perform the processes described herein. In some embodiments, the components 102-138 can all be implemented by a single server device, or across multiple server devices. Additionally or alternatively, a combination of one or more server devices and one or more client devices can implement the components 102-138. Furthermore, in one embodiment, the components 102-138 can comprise hardware, such as a special-purpose processing device to perform a certain function. Additionally or alternatively, the components 102-138 can comprise a combination of computer-executable instructions and hardware.

In one or more embodiments, the social networking application 104 can be a native application installed on the client computing device 102. For example, the social networking application 104 may be a mobile application that installs and runs on a mobile device, such as a smart phone or a tablet. Alternatively, the social networking application 104 can be a desktop application, widget, or other form of a native computer program. Alternatively, the social networking application 104 may be a remote application accessed by the client computing device 102. For example, the social networking application 104 may be a web application that is executed within a web browser of the client computing device 104.

As mentioned above, and as shown in FIG. 1, the social networking application 104 includes a display manager 106. The display manager 106 can provide, manage, and/or control a graphical user interface (or simply "user interface") that allows a user to compose, view, and submit social networking system posts and messages. For example, the display manager 106 provides a user interface that facilitates the display of a social network system user's newsfeed, wall, communication threads, etc. Similarly, the display manager 106 provides a user interface that displays one or more electronic messages or communication threads received by a social network system user.

More specifically, the display manager 106 facilitates the display of a user interface (e.g., by way of a display device associated with the client computing device 102). For example, the display manager 106 may compose the user interface of a plurality of graphical components, objects, and/or elements that allow a user to compose, send, and receive electronic messages, and/or social networking system posts. More particularly, the display manager 106 may direct the client computing device 102 to display a group of graphical components, objects, and/or elements that enable a user to view electronic messages, communication threads, or social networking system posts.

In addition, the display manager 106 directs the client computing device 102 to display one or more graphical objects, controls, or elements that facilitate user input for composing, sending, and/or submitting a social networking system post, and/or an electronic message. To illustrate, the display manager 106 provides a user interface that allows a user to provide user input to the social networking application 104. For example, the display manager 106 provides one or more user interfaces that allow a user to input one or more types of content into a social networking system post or electronic message. As used herein, "content" refers to any data or information to be included as part of a social networking system post or electronic message. For example, the term "content" will be used herein to generally describe text, images, digital media, files, location information, payment information, or any other data that can be included as part of a social networking system post or electronic message.

The display manager 106 can also facilitate the input of text or other data to be included in a social networking system post or electronic message. For example, the display manager 106 provides a user interface that includes a touch display keyboard. A user can interact with the touch display keyboard using one or more touch gestures to input text to be included in a social networking system post or electronic message. For example, a user can use the touch display keyboard to compose a message. In addition to text, the user interface, including the touch display keyboard, can facilitate the input of various other characters, symbols, icons, or other information.

Furthermore, the display manager 106 is capable of transitioning between two or more graphical user interfaces. For example, in one embodiment, the display manager 106 provides a newsfeed to a social networking system user containing one or more social networking system posts from co-users associated with the user via the social networking system. Later, in response to detected input from the user, the GUI manager 120 transitions to a second graphical user interface that includes a listing of one or more communication threads between the user and other parties.

As further illustrated in FIG. 1, the social networking application 104 includes an input detector 108. In one or more embodiments, the input detector 108 can detect, receive, and/or facilitate user input in any suitable manner. In some examples, the input detector 108 detects one or more user interactions with respect to the user interface. As referred to herein, a "user interaction" means a single interaction, or combination of interactions, received from a user by way of one or more input devices.

For example, input detector 108 detects a user interaction from a keyboard, mouse, touch page, touch screen, and/or any other input device. In the event the client computing device 102 includes a touch screen, the input detector 108 detects one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The input detector 108 may additionally, or alternatively, receive data representative of a user interaction. For example, input detector 108 may receive one or more user configurable parameters from a user, one or more user commands from the user, and/or any other suitable user input. The input detector 108 may receive input data from one or more components of the social networking system 116, or from one or more remote locations.

The social networking application 104 performs one or more functions in response to the input detector 108 detecting user input and/or receiving other data. Generally, a user can control, navigate within, and otherwise use the social networking application 104 by providing one or more user inputs that the input detector 108 can detect. For example, in response to the input detector 108 detecting user input, one or more components of the social networking application 104 allow a user to select a recipient for a message, compose a message, select content to include in a message, and/or send a message to the recipient. Additionally, in response to the input detector 108 detecting user input, one or more components of the social networking application 104 allow a user to navigate through one or more user interfaces to review and respond to received electronic messages, etc.

Also as shown in FIG. 1, the client computing device 102 also includes a plugin manager 110 and a web browser 112. As mentioned above, the web browser 112 is a software application that receives and interactively displays web resources (i.e., web pages). In one or more embodiments, the plugin manager 110 provides an interface between the web browser 112 and one or more plugins installed on the client computing device 102. In at least one embodiment, the plugin manager 110 provides an interface between the web browser 112 and a plugin associated with the social networking system 116.

As illustrated in FIG. 1, the system 100 includes the social networking system 116. The social networking system 116 can also provide social networking system posts and messages (whether text or otherwise) to one or more users of the social networking system 116 (e.g., by way of a profile, a newsfeed, a communication thread, a timeline, or a "wall"). For example, one or more embodiments present a user with a social networking system newsfeed and electronic messages from one or more co-users associated with the user via the social networking system 116. In one or more embodiments, the user scrolls through the social networking system newsfeed in order to view recent social networking system posts submitted by the one or more co-users associated with the user via the social networking system 116. In one embodiment, the social networking system 116 organizes the social networking system posts chronologically in a user's social networking system newsfeed. In alternative embodiments, the social networking system 116 organizes the social networking system posts geographically, by interest groups, according to a relationship coefficient between the user and the co-user, etc. Additionally, in one or more embodiments, the user can download a copy of the social networking system newsfeed as a record of the social networking system posts displayed thereon.

Furthermore, the social networking system 116 provides and organizes private electronic messages between a two or more social networking system users in a display including a communication thread. As used herein, a "communication thread" is a group of communications (i.e., electronic messages) sent back and forth between two entities (e.g., a social networking system user and a merchant). In at least one embodiment, the social networking system 116 also provides a listing of all communication threads in which a user is engaged. By selecting a particular communication thread in the listing, the user can view all messages within the particular communication thread. The social networking system 116 organizes a communication thread such that electronic messages from different parties are formatted and displayed in such a way as to indicate the author of each electronic message. As mentioned above, a communication thread can include electronic messages that consist of text, multimedia, hyperlinks, emoticons, stickers, rich communication objects, etc.

As used herein, a "rich communication object" is a displayed communication that includes structured data. In one or more embodiments, "structured data" can include any data that is structured into specific groups, fields, or categories, and/or is associated with particular aspects of an electronic message. Structured data can include metadata associated with node and edge information related to the electronic message, information related to the electronic message author, information related to a particular item featured in the electronic message, and interaction information related to the electronic message within the social networking system. To illustrate, structured data for an electronic message can include formatting information, the electronic message author's name and location, content of the electronic message, or any other specific types of information/data associated with the electronic message. The structured data may also include various multimedia content such as images (e.g., digital pictures, digital map images), video, audio, etc. Using this structured data, the social networking system can facilitate the insertion of "rich" objects within a communication thread or elsewhere, such rich objects providing more information and/or content than typical textual messages.

Furthermore, in at least one embodiment, a rich communication object can include payment tools. For example, a rich communication object can include controls that allow a user to submit a payment directly through the social networking system 116. Further, other payment tools can include escrow tools, remittance tools, credit card transaction tools, bank routing tools, etc.

Additionally, in one embodiment, the social networking system 116 transmits social networking system posts and/or electronic messages between users. For example, in response to a user submitting an electronic message to one or more social networking system users via the social networking system 116, the social networking system 116 updates the communication threads of other participants in the communication session to include the electronic message. In additional or alternative embodiments, the social networking system 116 further provides additional indicators within a communication thread that indicate whether a particular user in the communication session has seen or read a particular electronic message within the communication thread.

As mentioned above, and as illustrated in FIG. 1, the social networking system 116 further includes the communication manager 118, which manages all communications between the social networking system 116, social networking system users, and/or third parties (i.e., the merchant 114). The communication manager 118 includes a token manager 120. In one or more embodiments, in response to receiving an indication from a user, via a plugin on a third party website (i.e., a website hosted by the merchant 114), that the user would like to communicate anonymously with the third party website, the token manager 120 generates a permanent opaque token. The communication manager 118 uses the permanent opaque token generated by the token manager 120 to direct communications between the merchant and the social networking system user.

In one or more embodiments, the token manager 120 generates a permanent opaque token by creating a hash based on: a unique identifier associated with a particular social networking system user, a unique identifier associated with a particular merchant, and other information such as the date and time at which the token is created. For example, in at least one embodiment, the indication received via the plugin that a user wants to receive communications from a particular merchant (i.e., a "state attribute") includes information including a unique identifier for the particular merchant. The token manager 120 can then identify a unique identifier for the user within the social networking system 116 in order to create the hash upon which the permanent opaque token is based.

As used herein, a "hash" is simply the result of an arbitrary calculation that includes known values, such as a user's unique identifier, a merchant's unique identifier, and the date and time. The "hashed" result of this calculation is always unique, but can be determined by one who knows the arbitrary calculation in order to identify the values upon which the result is based. By utilizing a hash, the token manager 120 can generate a permanent opaque token representing a user/merchant pair that is unique and essentially encrypts the values contained therein.

Accordingly, in at least one embodiment, in addition to generating a permanent opaque token, the token manager 120 also decrypts the hash upon which a permanent opaque token is based in order to identify a user's unique identifier and/or a merchant's unique identifier. For example, in one or more embodiments and as laid out above, the token manager 120 knows the arbitrary calculation by which the user's unique identifier and the merchant's unique identifier are hashed in order to create the permanent opaque token. Thus, in order to later identify the user's unique identifier and/or the merchant's unique identifier, the token manager 120 simply determines the hash upon which the permanent opaque identifier is based.

Also as mentioned above, the communication manager 118 can include the merchant communicator 122. In one or more embodiments, the merchant communicator 122 manages a pre-registration process including a particular merchant. For example, in at least one embodiment and before a merchant can include the social networking system plugin as part of the merchant's website, the merchant needs to pre-register with the social networking system 116. Accordingly, in order to pre-register the merchant, the merchant communicator 122 receives a particular communication endpoint from the merchant, and in turn provides a set of social networking system communication endpoints to the merchant. The merchant communicator 122 then assigns a unique merchant identifier to the merchant and stores the unique merchant identifier along with the relevant communication endpoints for later use.

As used herein, a "communication endpoint" refers to a specific uniform resource locator ("URL"), server port, or web address that is indicative of the type of information that is received at that endpoint. For example, in one case, information received by a merchant at the communication endpoint, "www.merchant.com/social_networking_system" is information from the social networking system 116. Similarly, information received by the social networking system 116 at "www.socialnetworkingsystem.com/transaction_update" can be transaction update information meant from a particular merchant and meant for communication to a particular social networking system user.

Additionally, once a particular merchant has completed the pre-registration process, the merchant communicator 122 facilitates communications between the social networking system 118 and the particular merchant. For example, once the token manager 120 generates a permanent opaque token associated with a particular user and the merchant, the merchant communicator 122 communicates the generated permanent opaque token, in addition to messages and other information to the merchant by sending the token and other information to the communication endpoint provided by the merchant in the pre-registration process described above. This communication process is explained in further detail below with reference to FIG. 3.

Furthermore, the merchant communicator 122 receives communications from a particular merchant. For example, in one embodiment, a merchant sends a communication and a particular permanent opaque identifier to the communication manager 118. In that case, the merchant communicator 122 receives the communication and provides the particular permanent opaque identifier to the token manager 120 for decryption, as described above. Once the token manager 120 decrypts a user's unique identifier from the particular permanent opaque identifier, the merchant communicator can provide the merchant's communication to the communication generator 124 for reformatting prior to delivery to the user associated with the decrypted unique user identifier.

In one or more embodiments, as illustrated in FIG. 1, the communication manager 118 also includes the communication generator 124. Once the merchant communicator 122 receives a communication from the merchant 114, as described above, the communication generator 124 generates a rich communication object including the merchant's communication. In one embodiment, the communication generator 124 generates a rich communication object based on the social networking system's communication endpoint at which the merchant's communication was received. For example, if the merchant communicator 122 received a merchant's communication at the communication endpoint, "www.socialnetworkingsystem.com/delivery_status," the communication generator 124 can format the merchant's communication into a rich communication object in a predefined manner specific to delivery status notifications. In one or more embodiments, formatting a merchant's communication into a rich communication object includes changing a communication's layout, font size, color themes, adding images and pictures, etc. Additionally, the communication generator 124 can include non-displayed information into the rich communication object such as, but not limited to, header information (e.g., communication source, date and time of communication, etc.), node and edge information, and other structured data.

Furthermore, as mentioned above, and as illustrated in FIG. 1, the communication manager 118 also includes a data storage 126. As shown, the data storage 126 includes user data 128, merchant data 130, token data 132, communication data 134, node data 136, and edge data 138. In one or more embodiments, the user data 128 is representative of user information, such as described herein. Similarly, in one or more embodiments, the merchant data 130 is representative of merchant information, such as described herein. In one or more embodiments, the communication data 134 is representative of communication information, such as described herein. Further, in one or more embodiments, the token data 132 is representative of token information, such as described herein. Additionally, in one or more embodiments, the node data 134 and the edge data 136 is representative of node and edge information, respectively, such as described herein.

Figure 2:
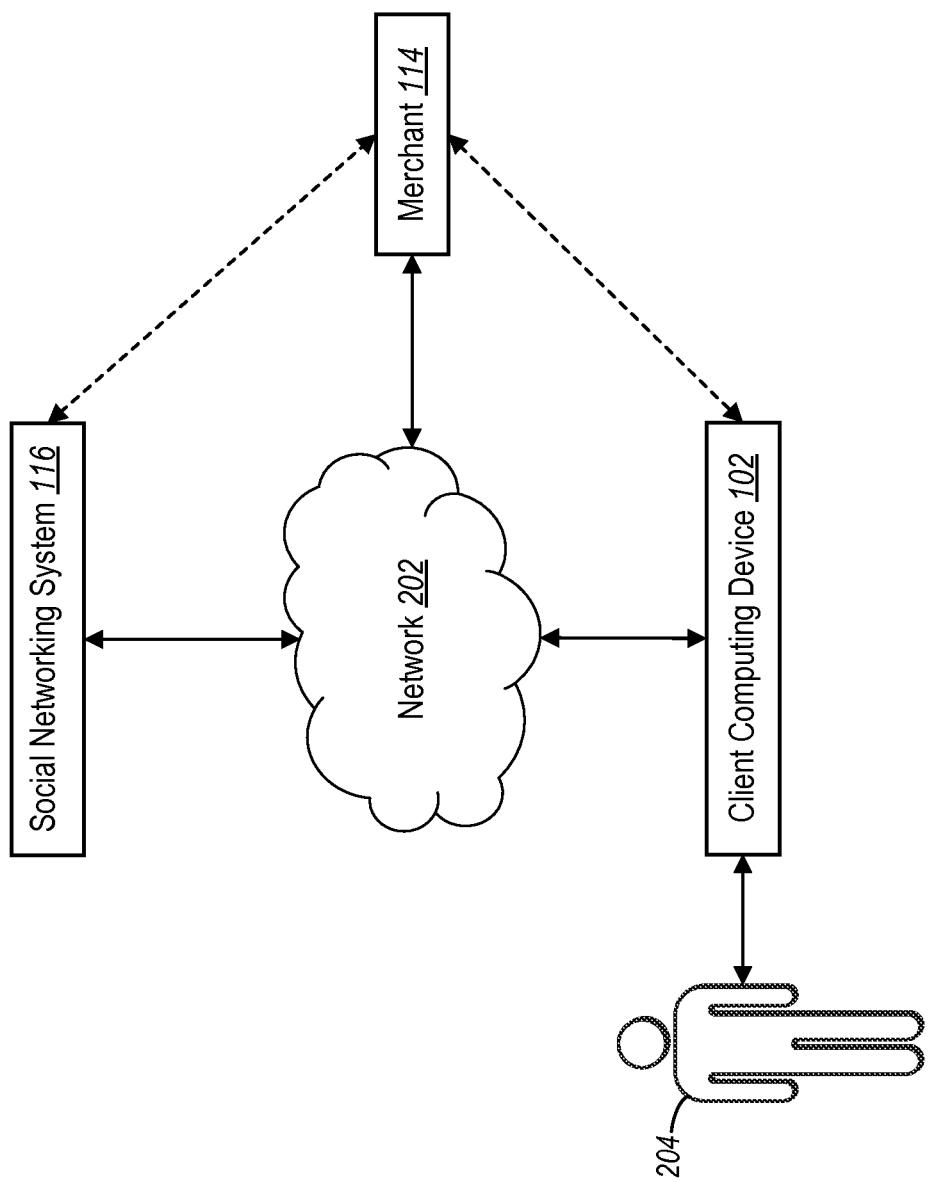
FIG. 2 illustrates a block diagram of an environment for implementing a communication system in accordance with one or more embodiments.

FIG. 2 illustrates an example schematic diagram of the communication system 100. As illustrated in FIG. 2, the communication system 100 includes the client computing device 102, the social networking system 116, and the merchant 114, which are communicatively coupled through a network 202. Also as illustrated in FIG. 2, a user 204 interacts with the client computing device 102 in order to access content and/or services on or provided by the social networking system 116 and/or the merchant 114. The client computing device 102 accesses the social networking system 116 via the social networking application 104, as described above with reference to FIG. 1. Similarly, the client computing device 102 may access the merchant 114 via the web browser 112, and in some cases utilizing the plugin manager 110, as described above with reference to FIG. 1. Furthermore, in one or more embodiments, the merchant 114 accesses the social networking system 116 via one or more communication endpoints defined during the pre-registration process, such as described above.

The client computing device 102, the merchant 114, and the social networking system 116 communicate via the network 202, which may include one or more networks and may use one or more communication platforms or technologies suitable for transmitting data and/or communication signals. In one or more embodiments, the network 202 includes the Internet or World Wide Web. The network 202, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 2 illustrates a particular arrangement of the client computing device 102, the social networking system 116, the merchant 114, and the network 202, various additional arrangements are possible. For example, the client computing device 102 may directly communicate with the social networking system 116 and/or the merchant 114, bypassing the network 202. Additional details relating to the network 202 are explained below with reference to FIG. 6.

As illustrated in FIG. 2, the communication system 100 includes the user 204. As described above, the user 204 may be individuals (i.e., human users), businesses, groups, or other entities. Although FIG. 2 illustrates one user 204, it is understood that the communication system 100 can include a plurality of users, with each of the plurality of users interacting with the communication system 100 through a corresponding plurality of client computing devices.

The client computing device 102 can be any one or more of various types of computing devices. For example, the client computing device 102 includes a mobile device such as a mobile telephone, a smartphone, a PDA, a tablet, a laptop or a non-mobile device such as a desktop, a server, or another type of computing device. Further, the client computing device 102 may run dedicated social networking applications (e.g., such as the social networking application 104, as described above in relation to FIG. 1) associated with the social networking system 116 to access social networking content (e.g., posts, messages, profiles, etc.) associated with the communication system 100. Additional details with respect to the client computing device 102 are discussed below with respect to FIG. 6.

Figure 3A:
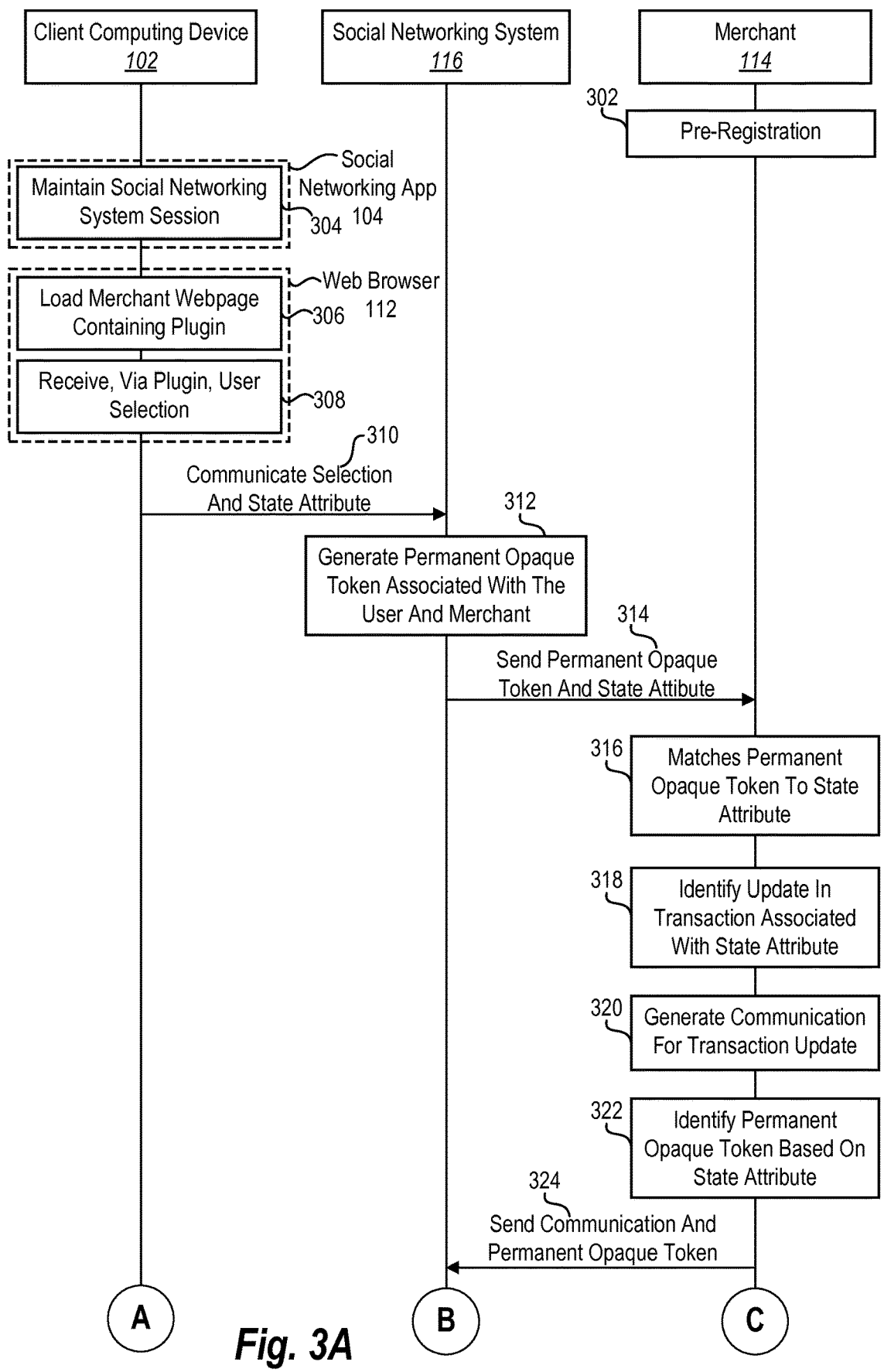
FIGS. 3A-3B illustrate a sequence-flow diagram illustrating interactions in a communication process between a user and a merchant via a social networking system in accordance with one or more embodiments.
Figure 3B:
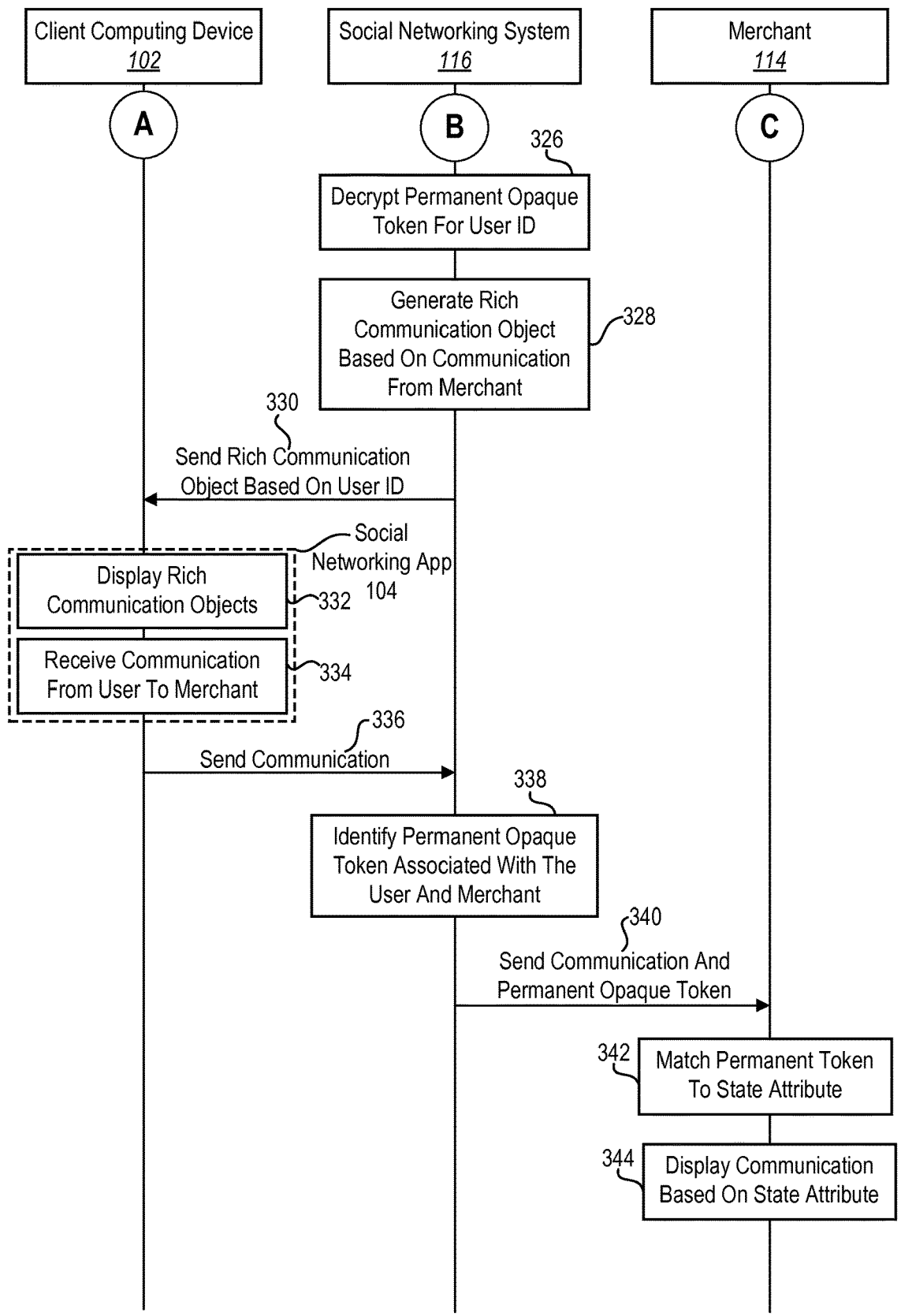

As discussed above, the systems and methods laid out with reference to FIGS. 1-2 can facilitate anonymous communications between a social networking system user and a merchant via a social networking system. FIGS. 3A-3B illustrate an example process diagram of one or more example embodiments of processes implemented by the system 100 discussed above. Consistent with the system 100 illustrated in FIGS. 1 and 2, FIGS. 3A-3B illustrate the user 204 utilizing the client computing device 102, the merchant 114, and the social networking system 116 facilitating anonymous communications between the client computing device 102 and the merchant 114.

In one or more embodiments, as shown in FIG. 3A, the illustrated process begins with the merchant 114 engaging in pre-registration (302). As described above, in one or more embodiments and in order for the merchant 114 to display a social networking system plugin on a particular webpage, the merchant 114 must first pre-register with the social networking system 116. The pre-registration process includes the merchant and the social networking system 116 exchanging a plurality of communication endpoints. As mentioned above, the communication endpoints provide both the merchant 114 and the social networking system 116 a specific URL, server port, web address, etc. where the merchant 114 and the social networking system 116 can send communications. For example, during pre-registration (302), the merchant 114 can provide the social networking system 116 with the communication endpoint, "www.merchant.com/social_networking_system." Similarly, during pre-registration (302), the social networking system 116 can provide the merchant 114 with a plurality of communication endpoints including, "www.socialnetworkingsystem.com/transaction_update," "www.socialnetworkingsystem.com/shipping_confirmation," "www.socialnetworkingsystem.com/purchase_receipt," etc. Thus, in one or more embodiments, the social networking system 116 can direct merchant communications to "www.merchant.com/social_networking_system," and the merchant 114 can direct social networking system communications related to a shipping confirmation to "www.socialnetworkingsystem.com/shipping_confirmation."

Additionally, if the merchant 114 opts to include a social networking system pixel in a particular web page rather than or in addition to a plugin, pre-registration (302) includes receiving the pixel code and a social networking system pixel ID specific to the merchant 114 from the social networking system. The merchant 114 inserts the pixel code and social networking system pixel ID into the code or scripting language for the particular web page. For example, the pixel code includes various method calls and conditional statements that enable the social networking system to track information via the web page. To illustrate, for an order confirmation web page, the code snippet enables the social networking system to track information including, but not limited to, a receipt ID, a timestamp, an account holder ID, a recipient name, a payment amount, a subtotal, a shipping cost, a total tax amount, a total cost, currency used, a payment method, a shipping address, and a list of items purchased along with information describing the purchased items (e.g., brand, size, color, gender, etc.). In response to a user indicating a desire to receive communications from the merchant 114 via the social networking system 116 (e.g., through an account setting prior to purchase), the social networking system 116 can utilize the tracked information in future communications with the user.

Furthermore, during pre-registration (302), the social networking system 116 can assign a unique identifier to the merchant 114. For example, as mentioned above, the communication manager 118 can generate a permanent opaque token that represents a unique pairing of a social networking system user and a merchant. This permanent opaque token can later be utilized to direct anonymous communications between the user and the merchant. Accordingly, when a merchant 114 pre-registers with the social networking system 116, the social networking system 116 can generate and assign a unique identifier to the merchant 114. The social networking system 116 can generate the unique merchant identifier to include an alpha-numeric sequence, a hash, or any other suitable unique identifier.

At some point following the merchant's pre-registration (302) with the social networking system 116, a user of the client computing device 102 can encounter a social networking system plugin embedded in a webpage hosted by the merchant 114. In one or more embodiments and in order for the user of the client computing device 102 to utilize the plugin, the client computing device 102 maintains a social networking system session (304). For example, in at least one embodiment, the social networking system plugin requires certain social networking system credentials (e.g., a login, a user identifier, etc.) before the social networking system plugin becomes functional. This information can be stored by the client computing device 102 in a specific file (e.g., a "cookie") stored by the client computing device 102. In at least one embodiment, the web browser 112 can access the cookie when attempting to load a merchant webpage containing the social networking system plugin. In one or more embodiments, if the web browser 112 attempts to initialize the plugin without an active social networking system session also open (as indicated by the cookie) within the web browser, the plugin will fail to initialize.

The social networking system plugin can automatically identify the needed credentials from an open social networking system session. In one embodiment, maintaining a social networking system session (304) occurs when the client computing device 102 is a mobile device (e.g., a mobile phone), and the user of the client computing device 102 is logged into the social networking system 116 within a social networking application 104 (as indicated by the dashed box in FIG. 3A) and also browsing a website associated with the merchant 114 within a web browser installed on the mobile device. In an additional or alternative embodiment, maintaining a social networking system session (304) is simply when the user of the client computing device 102 is logged into the social networking system 116 in one tab of a web browser, while browsing a website associated with the merchant 114 in another tab of the web browser. In yet further embodiments, the session is maintained if authentication/login credentials are otherwise available on the client computing device 102.

If the client computing device 102 has a currently maintained social networking system session (304), the client computing device can load a merchant webpage containing a plugin associated with the social networking system 116 (306). For example, in one embodiment and as mentioned above, if a cookie associated with the user 204 of the client computing device 102 does not indicate that there is a currently open social networking system session (304), the plugin embedded on the merchant's webpage will fail to initialize. If, however, the cookie does indicate that a social networking system session has been maintained (304) by the client computing device 102, the merchant's webpage containing the plugin can successfully load (306).

In one or more embodiments, the initialized plugin causes the web browser 112 to display an interactive control within the merchant's webpage. In one or more embodiments, the interactive control allows a user 204 of the client computing device 102 to select an option for allowing the merchant 114 to anonymously communicate with the user 204 via the social networking system 116. Additionally or alternatively, the interactive control can merely inform the user 204 that the user will receive anonymous communications from the merchant 114, and provide an option for the user 204 to opt out of the communications. Regardless of the configuration of the interactive control associated with the plugin, the client computing device 102 can receive, via the plugin the user's selection regarding the option to communicate with the merchant 114 (308) through the social networking system 116.

In one embodiment, the web browser 112 can load the initialized social networking system plugin (306) within a webpage associated with a purchase transaction between the user 204 and the merchant 114. For example, the user 204 may have utilized the merchant's 114 eCommerce website to select and purchase an item. The purchase transaction may include several webpages through which the user 204 can provide payment and delivery information. In one embodiment, and just before the user 204 confirms the order, the web browser 112 can display the interactive control associated with the initialized plugin to the user 204, which provides the user with the option that allows the merchant 114 to communicate with the user 204 through the social networking system 116. In other embodiments, the web browser 112 can provide the interactive control associated with the initialized plugin to the user 204 after the user confirms the order, or at another point in the eCommerce process. Additionally or alternatively, the web browser 112 can display different interactive controls associated with the initialized plugin at different points in the checkout and confirmation process within the merchant's website (e.g., if the user 204 opts out of receiving merchant communications via the plugin at one point in the checkout process, the web browser 112 can display the plugin with an "upsell" option at another point in the checkout process to ask the user 204 to confirm the opt out, etc.).

In additional or alternative embodiments, rather than using a web browser and plugin to visit a merchant website, the user may utilize a dedicated merchant mobile application to view and purchase goods. In that case, the user may have installed the merchant mobile application on a mobile device (e.g., a smart phone or tablet). In one or more embodiments, the merchant mobile application may rely on an application programming interface (API) in order to provide a display to the user via the mobile device, and communicate with the merchant.

In response to receiving, via the plugin, the user's selection regarding anonymous communications with the merchant 114, the client computing device 102 can communicate the user's plugin selection, along with a state attribute, to the social networking system 116 (310). In one or more embodiments, the state attribute associated with the merchant 114 can include the merchant's unique identifier (e.g., that the social networking system 116 assigned the merchant 114 during pre-registration (302)), the user's unique identifier (e.g., taken from the social networking system cookie), state information, and other information that references the transaction between the user 204 and the merchant 114. In one or more embodiments, the state attribute is generated by the plugin, and serves to provide context to any further communications regarding the transaction between the user 204 and social networking system 116, or the social networking system 116 and the merchant 114. For example, the state attribute in combination with a permanent opaque token allows the merchant 114 to correlate communications received from the social networking system 116 to a particular transaction and social networking system user 204. It should be noted that although the merchant 114 can correlate a particular transaction to a particular user 204, the merchant 114 never gains access to any information that specifically identifies the user 204 (e.g., an email address, the user's unique identifier within the social networking system 116, etc.).

Once the social networking system 116 receives the indication of the user's selection and the state attribute (310), the social networking system 116 can generate a permanent opaque token associated with the user 204 and the merchant 114 (312). As mentioned above, in one or more embodiments, the social networking system 116 can generate the permanent opaque token by creating a hash based on a unique identifier associated with the merchant 114 and a unique identifier associated with the user 204 of the client computing device 102. For example, the social networking system 116 can extract the unique identifier associated with the merchant 114 and the unique identifier associated with the user 204 from the state attribute communicated by the plugin (310). The social networking system 116 can then generate the permanent opaque token based on these identifiers. In additional embodiments, the social networking system 116 can further generate the permanent opaque token based on a date and time, also extracted from the state attribute.

As mentioned above, the permanent opaque token represents a pairing between the user 204 and the merchant 114. Accordingly, in at least one embodiment, the social networking system 116 stores the permanent opaque token such that the permanent opaque token can not only be used in association with communications related to a present transaction between the user 204 and the merchant 114, but also can be used in association with communications related to future transactions between the user 204 and the merchant 114. Thus, in at least one embodiment, the social networking system 116 can utilize the generated permanent opaque token to direct all communications between the merchant 114 and the user 204, regardless of the transaction. If a permanent opaque token exists representing a pairing between the user 204 and the merchant 114, the social networking system 116 can simply identify the needed permanent opaque token in step 312, rather than generating a new permanent opaque token.

Furthermore, in one or more embodiments, the social networking system 116 can also create nodes associated with the generated permanent opaque token and/or the transaction referred to by the state attribute received from the client computing device 102. For example, a node can include information associated with the user/merchant pairing represented by the permanent opaque token. Furthermore, the social networking system 116 can create a node representing each transaction between the user 204 and merchant 114. In at least one embodiment, the social networking system 116 can connect each node representing a transaction between the user 204 and the merchant 114 to the node representing the permanent opaque token with an edge. In this way, the social networking system 116 can use nodes and edges to represent an entire commercial relationship between the user 204 and the merchant 114. Alternative arrangements of the nodes, edges, and/or information contained therein are possible.

Next, once the social networking system 116 generates the permanent opaque identifier (312), the social networking system 116 can send the permanent opaque token and the state attribute to the merchant (314). It should be noted that the social networking system 116 can alter the state attribute before sending the state attribute to the merchant (314). For example, the social networking system 116 may include in the state attribute only the information the merchant 114 needs to correctly identify the transaction that correlates with the permanent opaque token. At this point, the merchant 114 can store the permanent opaque token and the state attribute (316). As mentioned above, the merchant 114 can store this information such that the permanent opaque token and the transaction data within the state attribute are correlated.

Thus, when the merchant 114 later identifies an update in the transaction associated with the state attribute (318), the merchant 114 can send a communication to the user 204 via the social networking system 116. For example, if the transaction is a purchase made by the user 204, the update may be that the user's credit card has been processed, or that the product purchased by the user has left the warehouse for delivery. If the transaction is a question regarding a product submitted by the user 204, the update may be a response submitted by a customer service representative of the merchant 114.

Once the update has been identified (318), the merchant can generate a communication associated with the transaction update (320). In one or more embodiments, generating a communication for a transaction update (320) can involve composing a message including natural language (e.g., "Thanks for your order!" "Your order has shipped." "Your order has been delivered."), multimedia (e.g., a digital image of a receipt, a digital picture of a product, etc.), hyperlinks (e.g., a hyperlink to a product webpage), interactive controls (e.g., buttons, text boxes) etc. Additionally, generating a communication for a transaction update (320) can further involve formatting a composed message such that the message is easily read and understood.

Before the merchant 114 can send the generated communication associated with the transaction update (320), the merchant 114 can also identify a permanent opaque token associated with the transaction based on the state attribute (322). As described above, the state attribute functions as the merchant's way of tracking a particular transaction. Because the merchant 114 stored the permanent opaque token in correlation with the state attribute in step 316, the merchant 114 can simply retrieve the stored permanent opaque token based on the state attribute in step 322. Once the merchant 114 identifies the permanent opaque token associated with the state attribute (322), the merchant 114 can send the generated communication and the permanent opaque token (324) to the social networking system 116. As mentioned above, the merchant 114 can send the communication and the permanent opaque token to a particular communication endpoint associated with the social networking system 116 depending on the type of transaction update that has occurred.

Upon receiving the communication and the permanent opaque token from the merchant 114, the social networking system 116 can decrypt the permanent opaque token in order to identify the user's 204 unique identifier (326). As mentioned above, in order to correctly direct the received communication from the merchant 114, the social networking system 116 must first determine the user's unique identifier. Additionally, the social networking system 116 can decrypt the permanent opaque token in order to identify the merchant's 114 unique identifier. The social networking system 116 can use this information to organize communications displayed by the social networking application 104 at the client computing device 102.

Additionally, the social networking system 116 can generate a rich communication object (328) based on the communication received from merchant 114. As mentioned above, a rich communication object can include a merchant's communication in addition to other structured data. In one or more embodiments, the social networking system 116 can generate a rich communication object (328) based not only on the communication received from the merchant 114, but also based on the social networking system 116 communication endpoint where the communication was received. For example, the social networking system 116 may generate one type of rich communication object for a communication received at the communication endpoint, "www.socialnetworkingsystem.com/delivery_status," and another type of rich communication object for a communication received at the communication endpoint, "www.socialnetworkingsystem.com/purchase_receipt." In additional or alternative embodiments, the social networking system 116 generates a standard text-based communication based on the communication received from the merchant 114.

Once the social networking system 116 generates the rich communication object (328), the social networking system 116 can send the rich communication object to the user (330) associated with the decrypted unique user identifier (i.e., as in step 326). Upon receiving the rich communication object, the client computing device 102 (e.g., via the social networking application 104) can display the rich communication object (332). In one or more embodiments, the client computing device 102 can display the rich communication object (332) within a communication thread where the user 204 and the merchant 114 are the thread participants.

In additional embodiments, the social networking system 116 can communicate any response from the user 204 back to the merchant 114 by utilizing the permanent opaque identifier in much the same way. For example, the user can respond to the displayed rich communication object (e.g., as in step 332). In at least one embodiment, the user can respond to the displayed rich communication object by composing a communication within the social networking application 104, which can receive the communication from the user 204 to the merchant 114 (334). The client computing device 102 can subsequently send the user's communication to the social networking system 116 (336).

In response to receiving the communication from the client computing device 102, the social networking system 116 can identify the permanent opaque token associated with the user 204 and merchant 114 pairing (338). As discussed above, the social networking system 116 can store a permanent opaque token in a node associated with the social networking system user (i.e., the user 204) upon whose unique user identifier the permanent opaque token is based. If a social networking system user is associated with more than one permanent opaque token (i.e., the user may have communication threads with multiple merchants), the social networking system 116 can identify the correct merchant from the communication thread from which the communication was sent (e.g., as in step 336). Accordingly, the social networking system 116 can identify the correct permanent opaque token based on the pairing of the user 204 and the merchant 114 (338).

The social networking system 116 can then send the communication and the permanent opaque token to the merchant 114 (340). In one or more embodiments, the merchant 114 can receive the communication and the permanent opaque token at a communication endpoint specified during the pre-registration process (302). In response to receiving the communication and the permanent opaque token, the merchant 114 can match the permanent token to a stored state attribute (342). As described above, the state attributes stored by the merchant 114 serve to identify a particular transaction involving a particular user. Accordingly, the merchant 114 can determine which stored state attribute is correlated with the received permanent opaque token (342).

Finally, the merchant 114 can display the communication based on the identified state attribute (344). In one or more embodiments, the merchant 114 can display the received communication via a dedicated webpage or application that allows the communication from the user 204 to be displayed as part of a communication thread. Accordingly, the received communication can be displayed as part of a history of communications between the merchant 114 and the user 204.

As will be described in more detail below, the components of the system 100 as described with regard to FIGS. 1-3B can provide, along and/or in combination with the other components, one or more graphical user interfaces ("GUIs"). In particular, the components can allow a user to interact with a collection of display elements for a variety of purposes. In particular, FIGS. 4A-4F and the description that follows illustrate various example embodiments of the user interfaces and features that are in accordance with general principles as described above.

For example, FIG. 4A illustrates a client computing device 400 of a social networking system user (e.g., the user 204) that may implement one or more of the components or features of the communication system 100. As shown, the client computing device is a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

As illustrated in FIG. 4A, the client computing device 400 includes a touch screen display 402 that can display user interfaces and by way of which user input may be received and/or detected. As used herein, a "touch screen display" refers to the display of a touch screen device. In one or more embodiments, a touch screen device may be the client computing device 102 with at least one surface upon which a user may perform touch gestures (e.g., a laptop, a tablet computer, a personal digital assistant, a media player, a mobile phone, etc.). Additionally or alternatively, the client computing device 300 may include any other suitable input device, such as a touch pad or those described below with reference to FIG. 6.

In FIG. 4A, the touch screen display 402 of the client computing device 400 displays a web browser GUI 404a provided by the web browser 112 installed thereon. As mentioned above, the web browser 112 provides the web browser GUI 404a to provide an interactive display whereby a user can read and interact with a web page. As shown in FIG. 4A, the web browser GUI 404a displays a pre-order checkout web page 406a. In one or more embodiments, a merchant 114 may display the pre-order checkout web page 406a as the last web page presented to a user in a checkout procedure. Accordingly, the pre-order checkout web page 406a includes order and shipping details along with a confirmation button (e.g., the "Place Order" button).

Also as shown in FIG. 4A, the pre-order checkout web page 406a includes a plugin display 408. As described above, if the user of the client computing device 400 is concurrently logged into the social networking system 116 (e.g., in another application or web browser tab), the social networking plugin can be initialized and provide the plugin display 408 of one or more options to the user. In an alternative embodiment, if the user of the client computing device 400 is not concurrently logged on to the social networking system 116, the plugin may fail to initialize, and the plugin display 408 may include a message such as, "Log in to your social networking system account to receive real-time shipping updates!" Although the plugin display 408 features an "opt-in" checkbox, in alternative embodiments, the plugin display 408 may feature an "opt-out" checkbox. Additionally in another alternative embodiment, the plugin may initialize as long as the client computing device 400 is storing a cookie or other data including the user's 204 social networking system login information, regardless of whether the client computing device 400 is concurrently logged on to the social networking system 116.

In response to the user of the client computing device 400 selecting the checkbox in the plugin display 408 and placing the order detailed in the pre-order checkout webpage 406a, the web browser 112 can display the post-order confirmation webpage 406b in the web browser GUI 404a on the touch screen display 402 of the client computing device 400, as illustrated in FIG. 4B. In one or more embodiments, the post-order confirmation webpage 406b confirms an order placed by a user. Additionally, as shown in FIG. 4B, because the user selected the "opt-in" option in the plugin display 408, as shown in FIG. 4A, the plugin or pixel display 408 can also provide a selection confirmation. For example, the plugin or pixel display 408 can include a confirmation that the user of the client computing device 400 will receive real-time updates, as well as a confirmation of the user's identity (e.g., "Richard Herner") and an option to cancel (e.g., "Not you?"). In one or more embodiments, the plugin manager 110 extracts the user's identity based on the cookie associated with the user's open social networking system session, as laid out above. In response to the user clicking "Not you?" the plugin manager 110 can deactivate the plugin, and/or allow the user to login to the social networking system 116 under a different account.

In response to the user of the client computing device 400 selecting to receive real-time updates from the merchant 114 via the social networking system 116, the display manager 106 of the social networking application 104 can display communications from the merchant 114 as part of a communication thread. Various examples of merchant communications are illustrated in FIGS. 4C-4E. For example, as shown in FIG. 4C, the display manager 106 of the social networking application 104 installed on the client computing device 400 can display a communication GUI 404b on the touch screen display 402 of the client computing device 400. In one or more embodiments, the communication GUI 404b can include a merchant indicator 412, indicating the merchant that is communicating with the user of the client computing device 400 (i.e., the user 204), and a communication thread 410. As described above, the communication thread 410 can include electronic messages and rich communication objects that have been sent back and forth between two or more entities.

In one or more embodiments, as shown in FIGS. 4C-4E, the communication thread 410 can include one or more rich communication objects 414a, 414b, 414c. For example, as shown in FIG. 4C, the rich communication object 414a includes a message and a structured display of a sale receipt from the merchant 114. As shown in FIG. 4D, the rich communication object 414b includes a message, a graphic indicating the delivery's current location, and structured communication with a delivery estimate from the merchant 114. As shown in FIG. 4E, the rich communication object 414c includes a message and a structured communication with a delivery confirmation from the merchant 114. As discussed above, the social networking system 116 can determine the format and content of the rich communication objects 414a, 414b, and 414c based on the communication endpoints where the underlying communication from the merchant 114 was received. Additionally, the social networking system 116 can utilize natural language processing, web lookups, databases, grammars, and other suitable techniques in determining the best format and content for a rich communication object based on an incoming communication.

In addition to rich communication objects, the communication thread 410 can also include standard electronic messages. For example, as shown in FIG. 4E, the communication thread 410 can include the electronic messages 416a, 416b, and 416c. As described above, the user of the client computing device 400 can communicate with the merchant 114 by simply composing and sending a written message (e.g., the electronic message 416a) or other type of message (e.g., a digital image as in the electronic message 416c) within the social networking application 104 (i.e., in the communication GUI 404b). The social networking system 116 can display any response from the merchant 114 within the communication thread 410 (e.g., the electronic message 416b).

In one or more embodiments, the electronic messages 416a-416c represent a "live chat." For example, rather than including programmatically created rich communication objects, such as the rich communication objects 414a-414c, the social networking system 116 can allow real-time unstructured communications between the user 204 and a live operator at the merchant 114. Accordingly, as shown in FIG. 4E, the electronic message 416b can be submitted by a live operator through the merchant 114. In this way, the user 204 can receive real-time information regarding order modifications, order cancelations, shipping changes, payment changes, or any other type of merchant support or service.

Additionally, as mentioned above, the social networking application 104 installed on the client computing device 400 can provide the user 204 with a listing of communication threads. For example, as shown in FIG. 4F, the display manager 106 can provide a thread listing GUI 404c on the touch screen display 402 of the client computing device 400. In one or more embodiments, the thread listing GUI 404c can include a communication thread listing 418 including one or more communication thread elements 420a-420h. In at least one embodiment, each communication thread element 420a-420h represents a communication thread including the user of the client computing device 400 and at least one other participant. The other participants in each of the communication threads can be merchants (e.g., as represented in communication thread elements 420b and 420d), individual social networking system users (e.g., as represented in communication thread elements 420a, 420c, 420e-420h), or groups of social networking system users. In response to detecting an interaction with any of the communication thread elements 420a-420h, the display manager 106 can update the touch screen display 402 to include a communication GUI (e.g., the communication GUI 404b) including the corresponding communication thread.

In additional embodiments, the plugin described above can also track activities performed by the user 204 in connection with a website hosted by the merchant 114. For example, the user 204 may search the merchant's website for a particular product only to find out the particular product is no longer in stock, and then navigate away from the merchant's website. The plugin can track the search and communicate the search to the merchant 114 in the manner described above with reference to FIGS. 3A-3B. Later, when the merchant 114 adds new stock of the particular product, the merchant 114 can communicate this information to the user 204 through the social networking system 116. Accordingly, the social networking system 16 can send the user 204 a rich communication object that includes a message such as, "The tent you were looking for at Solitude Camping is back in stock!"

In one or more embodiments, in addition to providing rich communication objects in a communication thread in the social networking application 104, the social networking system 116 can also provide push notifications to the client computing device 400. For example, a push notification can include a pop-up notification, an alert, a vibration, an icon, etc. This feature is useful to the merchant 114 in that the merchant 114 does not need to develop a dedicated application in order to easily communicate with customers. Rather, the merchant 114 can simply utilize the features and capabilities of the social networking system 116 to communication with the merchant's customers.

FIGS. 1-4F, the corresponding text, and examples, provide a number of different methods, systems, and devices for facilitating communication between a merchant and a social networking system user. In addition to the foregoing, embodiments can also be described in terms of flowcharts comprising acts and steps in a method for accomplishing a particular result. For example, FIG. 5 may be performed with less or more steps/acts or the steps/acts may be performed in differing orders. Additionally, the steps/acts described herein may be repeated or performed in parallel with one another or in parallel with different instances of the same or similar steps/acts.

Figure 5:
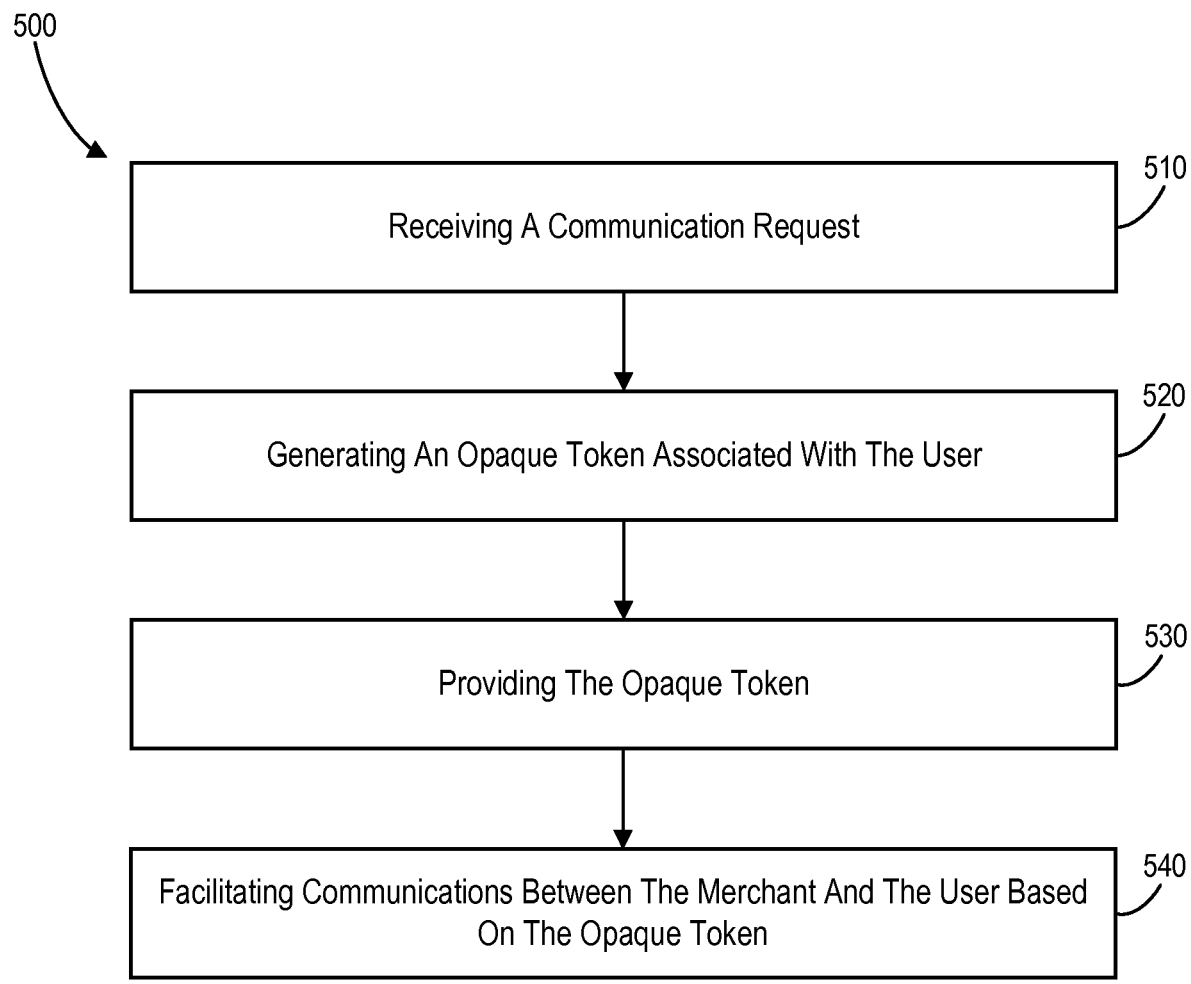
FIG. 5 illustrates a flowchart of a series of acts in a method of facilitating anonymous communications between a user and a merchant in accordance with one or more embodiments.

FIG. 5 illustrates a flowchart of one example method 500 of facilitating communications between a merchant and a social networking system user. The method 500 includes an act 510 of receiving a communication request. In particular, the act 510 can involve receiving, from a client computing device (e.g., the client computing device 102) associated with a user (e.g., the user 204), a communication request by way of a webpage plugin associated with a merchant (e.g., the merchant 114). In at least one embodiment, the method 500 further includes providing the webpage plugin to the merchant as part of a pre-registration process, the pre-registration process comprising receiving, from the merchant a merchant communication endpoint. For example, the pre-registration process can further include providing, to the merchant and in response to receiving the merchant communication endpoint, a plurality of social networking system communication endpoints.

The method 500 also includes an act 520 of generating an opaque token associated with the user. In particular, the act 520 can involve generating, in response to the received communication request, an opaque token associated with the user including an encrypted combination of an identifier associated with the merchant and an identifier associated with the user. In at least one embodiment, the encrypted combination can further include the date and time at which the opaque token was created.

Additionally, the method 500 includes an act 530 of providing the opaque token. In particular, the act 530 can involve providing the generated opaque token to the merchant. In at least one embodiment, the merchant can be provided with the generated opaque token via at least one communication endpoint.

Furthermore, the method 500 includes an act 540 of facilitating communications between the merchant and the user based on the opaque token. In particular, the act 540 can involve facilitating, using the opaque token, communications between the merchant and the user based on the opaque token. In one or more embodiments, facilitating communications between the merchant and the user includes: receiving, from the merchant, a message and the opaque token; decrypting the received opaque token to identify the identifier associated with the user; generating, based on the received message from the merchant, a rich communication object; and providing, based on the identifier associated with the user, the generated rich communication object to the user at the client device associated with the user. Additionally or alternatively, facilitating communications between the merchant and the user includes: receiving, via one or more of the plurality of social networking system communication endpoints and from the merchant, a message and the opaque token; decrypting the received opaque token to identify the identifier associated with the user; generating, based on the received message from the merchant and the one or more plurality of communication endpoints, a rich communication object; and providing, based on the identifier associated with the user, the generated rich communication object to the user at the client device associated with the user. In one or more embodiments, the rich communication object comprises one or more of text, a digital photograph, a digital image, a hyperlink, and an interactive control. Furthermore, the method 500 can include formatting the rich communication object based on the one or more communication endpoints by which the communication from the merchant was received.

In at least one embodiment, the method 500 further includes: receiving, in response to the generated rich communication object, a communication from the user directed to the merchant; identifying the generated opaque token associated with the user; and providing, to the merchant, the opaque token and the communication from the user. In some embodiments, facilitating communications between the merchant and the user includes providing communications to the user from the merchant by way of a social networking system communications application, and providing communications to the merchant from the user by way of the social networking system. In that case, facilitating communications between the merchant and the user can further receiving communications from the merchant addressed to the user by way of a dedicated web address.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
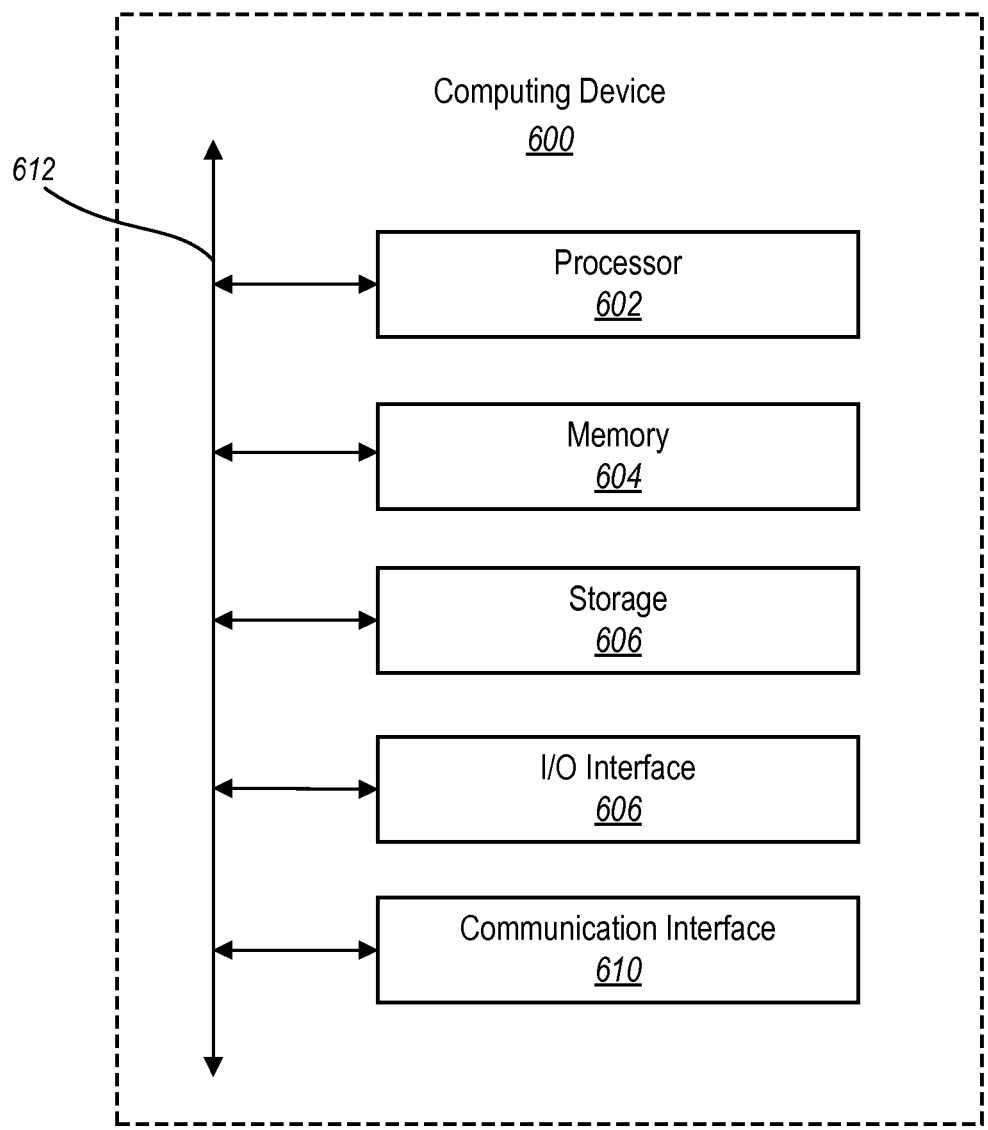
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the system 100. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 7:
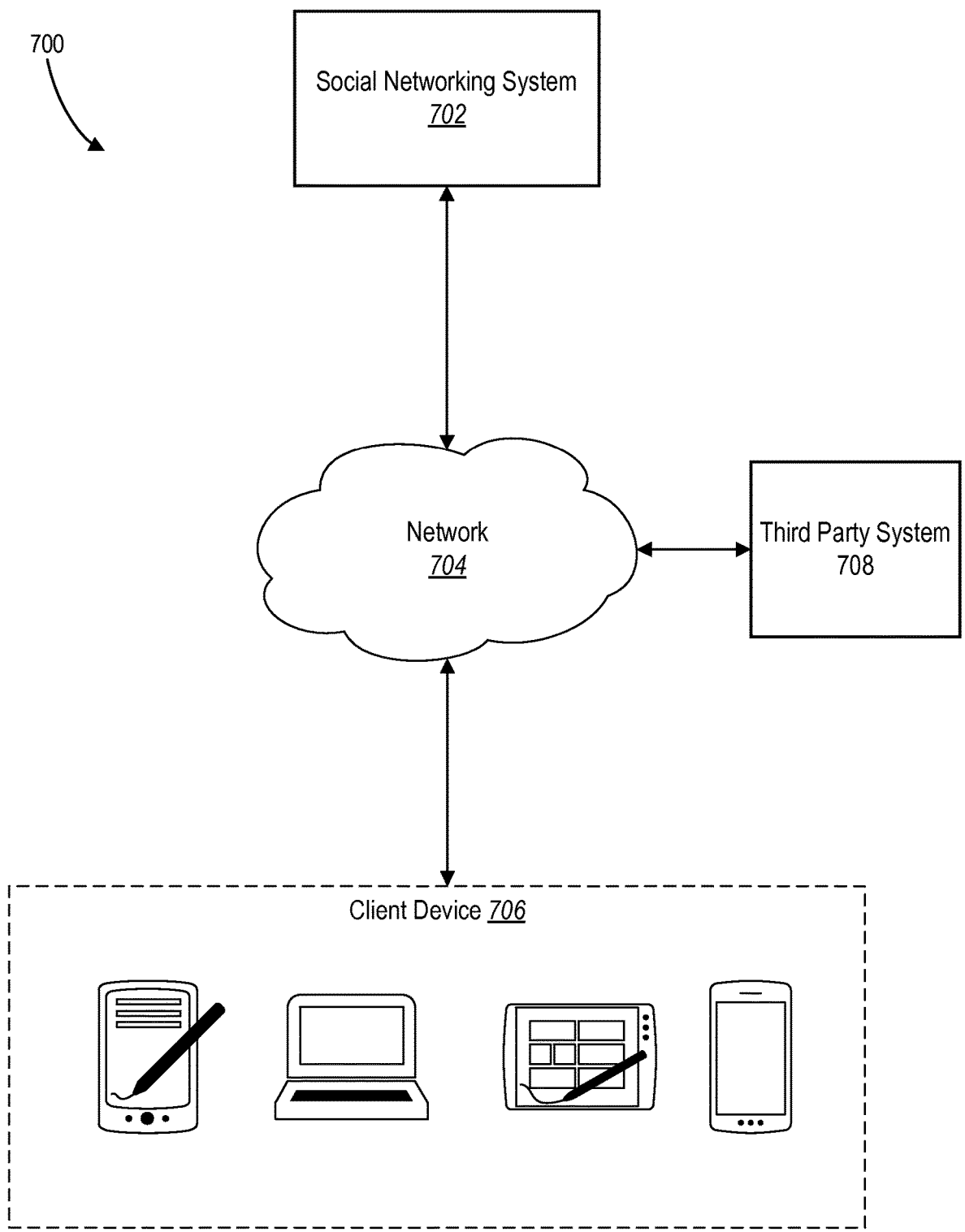
FIG. 7 is an example network environment of a social networking system in accordance with one or more embodiments.

FIG. 7 illustrates an example network environment 700 of a social networking system. Network environment 700 includes a client device 706, a social networking system 702, and a third-party system 708 connected to each other by a network 704. Although FIG. 7 illustrates a particular arrangement of client device 706, social networking system 702, third-party system 708, and network 704, this disclosure contemplates any suitable arrangement of client device 706, social networking system 702, third-party system 708, and network 704. As an example and not by way of limitation, two or more of client device 706, social networking system 702, and third-party system 708 may be connected to each other directly, bypassing network 704. As another example, two or more of client device 706, social networking system 702, and third-party system 708 may be physically or logically co-located with each other in whole or in part. Moreover, although FIG. 7 illustrates a particular number of client devices 706, social networking systems 702, third-party systems 708, and networks 704, this disclosure contemplates any suitable number of client devices 706, social networking systems 702, third-party systems 708, and networks 704. As an example and not by way of limitation, network environment 700 may include multiple client device 706, social networking systems 702, third-party systems 708, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client device 706, social networking system 702, and third-party system 708 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client device 706 may be an electronic device including hardware, software, or embedded logic components or a combination of two or more such components and capable of carrying out the appropriate functionalities implemented or supported by client device 706. As an example and not by way of limitation, a client device 706 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 706. A client device 706 may enable a network user at client device 706 to access network 704. A client device 706 may enable its user to communicate with other users at other client devices 706.

In particular embodiments, client device 706 may include a web browser, such as MICROSOFT INTERNET EXPLORER, GOOGLE CHROME or MOZILLA FIRE- FOX, and may have one or more add-ons, plugins, or other extensions, such as TOOLBAR or YAHOO TOOLBAR. A user at client device 706 may enter a Uniform Resource Locator (URL) or other address directing the web browser to a particular server (such as server, or a server associated with a third-party system 708), and the web browser may generate a Hyper Text Transfer Protocol (HTTP) request and communicate the HTTP request to server. The server may accept the HTTP request and communicate to client device 706 one or more Hyper Text Markup Language (HTML) files responsive to the HTTP request. Client device 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 702 may be a network-addressable computing system that can host an online social network. Social networking system 702 may generate, store, receive, and send social-networking data, such as, for example, user-profile data, concept-profile data, social-graph information, or other suitable data related to the online social network. Social networking system 702 may be accessed by the other components of network environment 700 either directly or via network 704. In particular embodiments, social networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 706, a social networking system 702, or a third-party system 708 to manage, retrieve, modify, add, or delete, the information stored in data store.

In particular embodiments, social networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 702 may provide users of the online social network the ability to communicate and interact with other users. In particular embodiments, users may join the online social network via social networking system 702 and then add connections (e.g., relationships) to a number of other users of social networking system 702 whom they want to be connected to. Herein, the term "friend" may refer to any other user of social networking system 702 with whom a user has formed a connection, association, or relationship via social networking system 702.

In particular embodiments, social networking system 702 may provide users with the ability to take actions on various types of items or objects, supported by social networking system 702. As an example and not by way of limitation, the items and objects may include groups or social networks to which users of social networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 702 or by an external system of third-party system 708, which is separate from social networking system 702 and coupled to social networking system 702 via a network 704.

In particular embodiments, social networking system 702 may be capable of linking a variety of entities. As an example and not by way of limitation, social networking system 702 may enable users to interact with each other as well as receive content from third-party systems 708 or other entities, or to allow users to interact with these entities through an application programming interfaces (API) or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social networking system 702. In particular embodiments, however, social networking system 702 and third-party systems 708 may operate in conjunction with each other to provide social-networking services to users of social networking system 702 or third-party systems 708. In this sense, social networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client device 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 702 also includes user-generated content objects, which may enhance a user's interactions with social networking system 702. User-generated content may include anything a user can add, upload, send, or "post" to social networking system 702. As an example and not by way of limitation, a user communicates posts to social networking system 702 from a client device 706. Posts may include data such as status updates or other textual data, location information, photos, videos, links, music or other similar data or media. Content may also be added to social networking system 702 by a third-party through a "communication channel," such as a newsfeed or stream.

In particular embodiments, social networking system 702 may include a variety of servers, sub-systems, programs, modules, logs, and data stores. In particular embodiments, social networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 702 may also include suitable components such as network interfaces, security mechanisms, load balancers, failover servers, management-and-network-operations consoles, other suitable components, or any suitable combination thereof. In particular embodiments, social networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 702 to one or more client devices 706 or one or more third-party system 708 via network 704. The web server may include a mail server or other messaging functionality for receiving and routing messages between social networking system 702 and one or more client devices 706. An API-request server may allow a third-party system 708 to access information from social networking system 702 by calling one or more APIs. An action logger may be used to receive communications from a web server about a user's actions on or off social networking system 702. In conjunction with the action log, a third-party-content-object log may be maintained of user exposures to third-party-content objects. A notification controller may provide information regarding content objects to a client device 706. Information may be pushed to a client device 706 as notifications, or information may be pulled from client device 706 responsive to a request received from client device 706. Authorization servers may be used to enforce one or more privacy settings of the users of social networking system 702. A privacy setting of a user determines how particular information associated with a user can be shared. The authorization server may allow users to opt in to or opt out of having their actions logged by social networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client devices 706 associated with users. Advertisement-pricing modules may combine social information, the current time, location information, or other suitable information to provide relevant advertisements, in the form of notifications, to a user.

Figure 8:
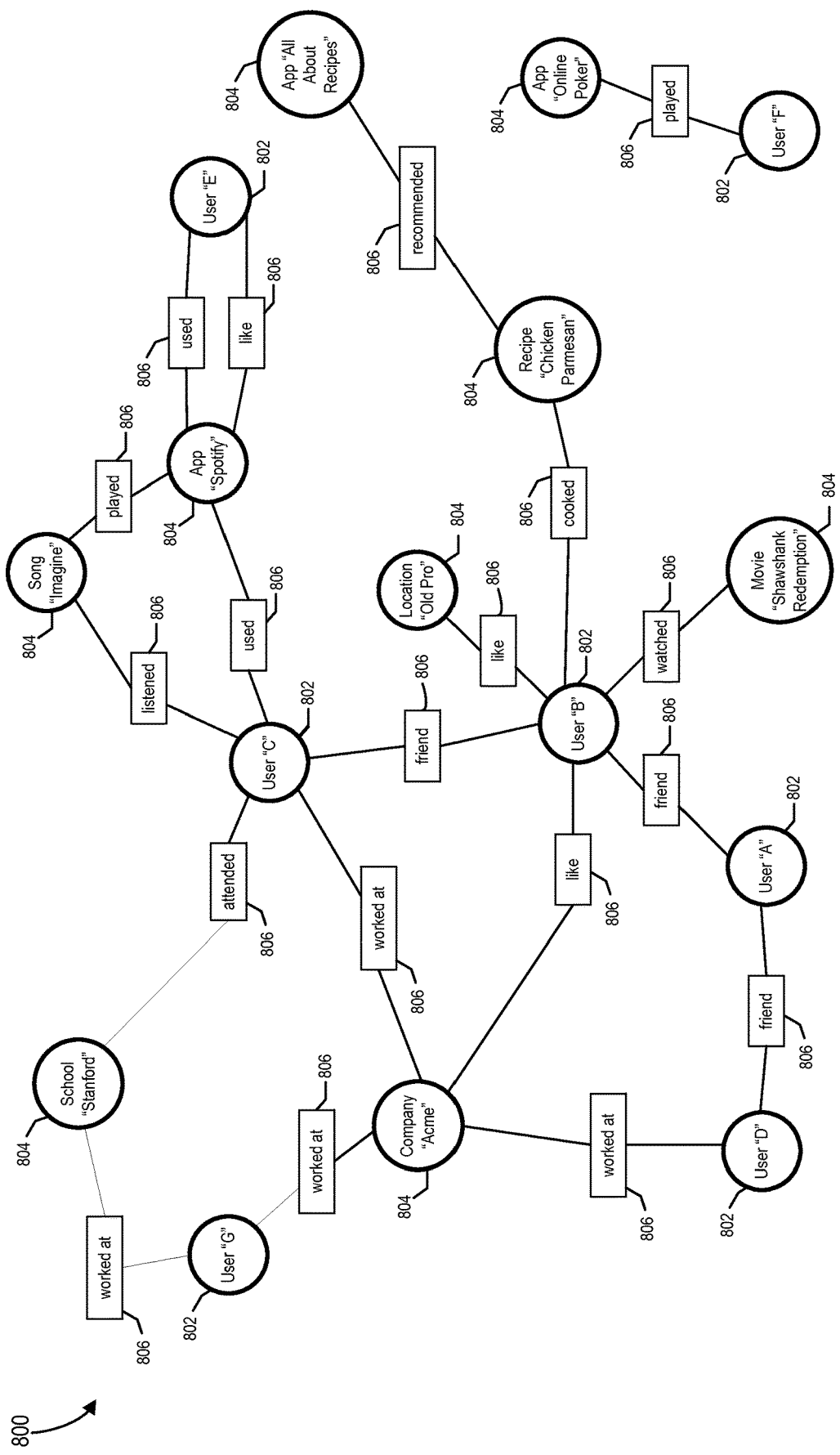
FIG. 8 illustrates a social graph in accordance with one or more embodiments.

FIG. 8 illustrates example social graph 800. In particular embodiments, social networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social networking system 702, client device 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social networking system 702. As an example and not by way of limitation, a user may be an individual (human user), an entity (e.g., an enterprise, business, or third-party application), or a group (e.g., of individuals or entities) that interacts or communicates with or over social networking system 702. In particular embodiments, when a user registers for an account with social networking system 702, social networking system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social networking system 702. In particular embodiments, a user node 802 may be associated with information provided by a user or information gathered by various systems, including social networking system 702. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 702 or a third-party website associated with a web-application server); an entity (such as, for example, a person, business, group, sports team, or celebrity); a resource (such as, for example, an audio file, video file, digital photo, text file, structured document, or application) which may be located within social networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social networking system 702. Profile pages may also be hosted on third-party websites associated with a third-party server 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 806 to send to social networking system 702 a message indicating the user's action. In response to the message, social networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social networking system 702 may send a "friend request" to the second user. If the second user confirms the "friend request," social networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to a edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships.

As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social networking system 702 may create an edge 806 between a user node 802 and a concept node 804 in social graph 800. As an example and not by way of limitation, a user viewing a concept-profile page (such as, for example, by using a web browser or a special-purpose application hosted by the user's client device 706) may indicate that he or she likes the concept represented by the concept node 804 by clicking or selecting a "Like" icon, which may cause the user's client device 706 to send to social networking system 702 a message indicating the user's liking of the concept associated with the concept-profile page. In response to the message, social networking system 702 may create an edge 806 between user node 802 associated with the user and concept node 804, as illustrated by "like" edge 806 between the user and concept node 804. In particular embodiments, social networking system 702 may store an edge 806 in one or more data stores. In particular embodiments, an edge 806 may be automatically formed by social networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 702) or RSVP (e.g., through social networking system 702) to an event associated with the advertisement. In addition or as an alternative, an advertisement may include social-networking-system context directed to the user. As an example and not by way of limitation, an advertisement may display information about a friend of the user within social networking system 702 who has taken an action associated with the subject matter of the advertisement.

In particular embodiments, social networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 702 may calculate a coefficient based on a user's actions. Social networking system 702 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 702 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social networking system 702 may analyze a user's actions to determine whether one or more of the actions indicate an affinity for subject matter, content, other users, and so forth. As an example and not by way of limitation, if a user may make frequently posts content related to "coffee" or variants thereof, social networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 702 may calculate a coefficient based on the type of relationship between particular objects. Referencing the social graph 800, social networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 702 may determine that the user has a higher coefficient with respect to the first photo than the second photo because having a tagged-in-type relationship with content may be assigned a higher weight and/or rating than having a like-type relationship with content. In particular embodiments, social networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 702 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 806 of the user). A first user may be more interested in other users or concepts that are closer to the first user. As an example and not by way of limitation, if a user is one mile from an airport and two miles from a gas station, social networking system 702 may determine that the user has a higher coefficient for the airport than the gas station based on the proximity of the airport to the user.

In particular embodiments, social networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 702 may provide information that is relevant to user's interests and current circumstances, increasing the likelihood that they will find such information of interest. In particular embodiments, social networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social networking system 702 may calculate the coefficient (or access the coefficient information if it has previously been calculated and stored). In particular embodiments, social networking system 702 may measure an affinity with respect to a particular process. Different processes (both internal and external to the online social network) may request a coefficient for a particular object or set of objects. Social networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1, Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social networking system 702 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 702 may send a request to the data store for the object. The request may identify the user associated with the request and may only be sent to the user (or a client device 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   receiving, by a social networking system server and from a client computing device associated with a user, a communication request by way of a social networking system plugin on a webpage associated with a merchant;
   generating, in response to the received communication request, an opaque token associated with the user by creating a hash based on an identifier associated with the merchant and an identifier associated with the user;
   providing, by the social networking system server, the generated opaque token to a third-party server associated with the merchant; and
   providing, to the merchant within a social networking system communication interface and using the opaque token, an electronic messaging communication thread between the merchant and the user where an identity of the user is anonymous to the merchant within the electronic messaging communication thread.

2. The method as recited in claim 1, wherein providing, to the merchant within the social networking system communication interface and using the opaque token, the electronic messaging communication thread between the merchant and the user comprises:
   receiving, by the social networking system server and from the merchant, a message and the opaque token;
   decrypting the received opaque token to identify the identifier associated with the user; and
   generating, based on the received message from the merchant, the electronic messaging communication thread between the merchant and the user comprising the message.

3. The method as recited in claim 1, further comprising providing, by the social networking system server, the webpage plugin to the merchant as part of a pre-registration process, the pre-registration process comprising receiving, from the merchant a merchant communication endpoint.

4. The method as recited in claim 3, wherein the pre-registration process further comprises providing, by the social networking system server to the merchant and in response to receiving the merchant communication endpoint, a plurality of social networking system communication endpoints.

5. The method as recited in claim 4, wherein providing, to the merchant within the social networking system communication interface and using the opaque token, the electronic messaging communication thread between the merchant and the user comprises:
   receiving, by the social networking system server via one or more of the plurality of social networking system communication endpoints and from the merchant, a message and the opaque token;
   decrypting the received opaque token to identify the identifier associated with the user; and
   generating, based on the received message from the merchant and the one or more plurality of communication endpoints, the electronic messaging communication thread between the merchant and the user comprising the message.

6. The method as recited in claim 5, further comprising generating a rich communication object comprising the message from the merchant, wherein generating the electronic messaging communication thread further comprises replacing the message with the rich communication object.

7. The method as recited in claim 5, further comprising formatting the message based on the one or more communication endpoints by which the message was received.

8. The method as recited in claim 5, further comprising:
   receiving, by the social networking system server and in response to the generated electronic messaging communication thread, a communication from the user directed to the merchant;
   identifying the generated opaque token associated with the user; and
   providing, by the social networking system server to the merchant, the opaque token and the communication from the user as part of the electronic messaging communication thread.

9. The method as recited in claim 1, further comprising facilitating the electronic messaging communication thread between the merchant and the user by providing, by the social networking system server, communications to the user from the merchant by way of a social networking system communications application while allowing the user to see the identity of the merchant, and providing communications to the merchant from the user by way of the social networking system while the identity of the user is anonymous to the merchant.

10. The method as recited in claim 9, wherein facilitating the electronic messaging communication thread between the merchant and the user within a social networking system communication interface further comprises receiving, by the social networking system server, communications from the merchant addressed to the user by way of a dedicated web address.

11. A social networking system server comprising:
at least one processor; and
at least one non-transitory computer-readable storage medium storing instructions thereon that, when executed by the at least one processor, cause the social networking system server to:
receive, from a client computing device associated with a user, a communication request by way of a social networking system plugin on a webpage associated with a merchant;
generate, in response to the received communication request, an opaque token associated with the user by creating a hash based on an identifier associated with the merchant and an identifier associated with the user;
provide the generated opaque token to a third-party server associated with the merchant; and
provide, to the merchant within a social networking system communication interface and using the opaque token, an electronic messaging communication thread between the merchant and the user based on the opaque token where an identity of the user is anonymous to the merchant within the electronic messaging communication thread.

12. The system as recited in claim 11, further storing instructions that, when executed by the at least one processor, cause the social networking system server to provide the webpage plugin to the merchant as part of a pre-registration process, the pre-registration process comprising receiving, from the merchant a merchant communication endpoint, and provide, to the merchant and in response to receiving the merchant communication endpoint, a plurality of social networking system communication endpoints.

13. The system as recited in claim 12, wherein providing, to the merchant within the social networking system communication interface and using the opaque token, the electronic messaging communication thread between the merchant and the user comprises:
receiving, via one or more of the plurality of social networking system communication endpoints and from the merchant, a message and the opaque token;
decrypting the received opaque token to identify the identifier associated with the user; and
generating, based on the received message from the merchant and the one or more plurality of communication endpoints, the electronic message communication thread between the merchant and the user comprising the message.

14. The system as recited in claim 13, further storing instructions that, when executed by the at least one processor, cause the social networking system server to generate a rich communication object comprising the message, wherein the rich communication object comprises one or more of text, a digital photograph, a digital image, a hyperlink, and an interactive control.

15. The system as recited in claim 14, wherein the instructions, when executed by the at least one processor, further cause the social networking system server to format the rich communication object based on the one or more communication endpoints by which the message from the merchant was received.

16. The system as recited in claim 15, further storing instructions that, when executed by the at least one processor, cause the social networking system server to:
receive, in response to the generated electronic messaging communication thread, a communication from the user directed to the merchant;
identify the generated opaque token associated with the user; and
provide, to the merchant, the opaque token and the communication from the user as part of the electronic messaging communication thread.

17. The system as recited in claim 16, further storing instructions that, when executed by the at least one processor, cause the social networking system server to facilitate the electronic messaging communication thread between the merchant and the user by providing communications to the user from the merchant by way of a social networking system communications application while allowing the user to see the identity of the merchant, and providing communications to the merchant from the user by way of the social networking system while the identity of the user is anonymous to the merchant.

18. The system as recited in claim 17, facilitating the electronic messaging communication thread between the merchant and the user within a social networking system communication interface further comprises receiving communications from the merchant addressed to the user by way of a dedicated web address.

19. A non-transitory computer readable medium storing instructions thereon that, when executed by at least one processor, cause a social networking system server to:
receive, from a client computing device associated with a user, a communication request by way of a social networking system plugin on a webpage associated with a merchant;
generate, in response to the received communication request, an opaque token associated with the user by creating a hash based on an identifier associated with the merchant and an identifier associated with the user;
provide the generated opaque token to a third-party server associated with the merchant; and
provide, to the merchant within a social networking system communication interface and using the opaque token, an electronic messaging communication thread between the merchant and the user based on the opaque token where an identity of the user is anonymous to the merchant within the electronic messaging communication thread.

20. The non-transitory computer readable medium as recited in claim 19, wherein providing, to the merchant within the social networking system communication interface and using the opaque token, the electronic messaging communication thread between the merchant and the user comprises:
receiving, from the merchant, a message and the opaque token;
decrypting the received opaque token to identify the identifier associated with the user; and generating, based on the received message from the merchant, the electronic message communication thread between the merchant and the user.

\* \* \* \* \*